(12) United States Patent
Hayashi et al.

(10) Patent No.: US 6,398,059 B1
(45) Date of Patent: Jun. 4, 2002

(54) FUEL CONTAINER

(75) Inventors: Nahoto Hayashi, Kurashiki; Yasuhiko Haneda, Tokyo; Hiroyuki Shimo; Keizo Michihata, both of Kurashiki; Hitoshi Tachino, Ichihara, all of (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/673,652

(22) PCT Filed: Mar. 2, 2000

(86) PCT No.: PCT/JP00/01248

§ 371 (c)(1),
(2), (4) Date: Dec. 21, 2000

(87) PCT Pub. No.: WO00/51907

PCT Pub. Date: Sep. 8, 2000

(30) Foreign Application Priority Data

| Mar. 4, 1999 | (JP) | ................................................ 11-56546 |
| Jun. 18, 1999 | (JP) | ........................................... 11-172151 |
| Jun. 18, 1999 | (JP) | ........................................... 11-172152 |
| Sep. 7, 1999 | (JP) | ........................................... 11-253006 |
| Sep. 7, 1999 | (JP) | ........................................... 11-253007 |
| Nov. 8, 1999 | (JP) | ........................................... 11-316839 |
| Nov. 8, 1999 | (JP) | ........................................... 11-376838 |

(51) Int. Cl.$^7$ .............................................. B65D 88/00
(52) U.S. Cl. ..................... 220/562; 220/62.22; 220/4.13
(58) Field of Search ............................. 220/562, 4.13, 220/4.14, 62.22; 524/394

(56) References Cited

U.S. PATENT DOCUMENTS

| 5,003,002 | A | | 3/1991 | Ofstein |
| 5,129,544 | A | * | 7/1992 | Jacobson et al. ............ 220/562 |
| 5,344,038 | A | * | 9/1994 | Freeman et al. ......... 220/62.22 |
| 5,383,567 | A | * | 1/1995 | Sorathia et al. ............ 220/4.13 |
| 5,384,172 | A | * | 1/1995 | Takado et al. ......... 220/4.13 X |
| 6,026,977 | A | * | 2/2000 | Palazzo ................. 220/4.13 X |
| 6,033,749 | A | | 3/2000 | Hata et al. |
| 6,093,462 | A | * | 7/2000 | O'Herron et al. .... 220/62.22 X |

FOREIGN PATENT DOCUMENTS

| EP | 0 926 199 | 6/1999 |
| JP | 2-209206 | 8/1990 |
| JP | 6-328634 | 11/1994 |
| JP | 7-052333 | 2/1995 |
| JP | 8-040090 | 2/1996 |
| JP | 10-156978 | 6/1998 |

\* cited by examiner

*Primary Examiner*—Steven Pollard
(74) *Attorney, Agent, or Firm*—Oblon, Spivak, McClelland, Maier & Neustadt, P.C.

(57) ABSTRACT

The molded component is formed by mixing or laminating a barrier resin (A) having a solubility parameter (calculated from the Fedors' equation) of more than 11 and a thermoplastic resin (B) having a solubility parameter (calculated from the Fedors' equation) of not more than 11. The molded component has excellent gasoline barrier properties and also excellent performance in thermal fusion properties and mechanical strength. The fuel container provided with such a molded component is significantly improved with regard to leakage of fuel from the molded component portion.

28 Claims, 2 Drawing Sheets

FUEL CONTAINER

TECHNICAL FIELD

The present invention relates to a fuel container with a molded component for the fuel container having excellent gasoline barrier properties, thermal fusion properties, and mechanical strength mounted on a fuel container body.

BACKGROUND ART

In recent years, in the field of fuel containers typically used in automobiles, fuel containers made of a thermoplastic resin have increasingly replaced fuel containers made of metal, because of their reduced weight, good rust prevention properties, ease of molding and processing and recycle properties.

However, a fuel container made of a thermoplastic resin causes the problem of permeation and volatilization of the gasoline component from the fuel container body. To cope with this problem, a multilayered fuel container comprising ethylene-vinyl alcohol copolymer (hereinafter, referred to as EVOH), which has high gas barrier properties, has been developed (e.g., Japanese Laid-Open Patent Publication No. 9-29904). Thus, EVOH contained in a fuel container significantly contributes to solving the problem of permeation and volatilization of the gasoline component from the fuel container body.

On the other hand, molded components provided in the fuel container (for example, a fuel tube, a vent line of a fuel filler port, a pressure relief valve and connectors connecting these elements to the container body) generally are made of high density polyethylene. For this reason, permeation and volatilization of the fuel occur. Therefore, even if the fuel container body has good gas barrier properties, fuel may permeate and volatilize from the molded components connected thereto, in an amount that cannot be ignored.

Therefore, it seems advantageous to use a barrier resin (e.g., EVOH) in place of high density polyethylene. When only the barrier resin is used for the molded component for a fuel container, the problem of permeation and volatilization of gasoline can be solved, but the thermal fusion properties to the fuel container body, the mechanical strength, and the impact resistance are unsatisfactory.

In this context, a molded component for a fuel container that can provide excellent performance in gasoline barrier properties, thermal fusion properties and mechanical strength is desired. Fuel containers provided with such a molded component improve with regard to the leakage of fuel from the molded component significantly.

DISCLOSURE OF INVENTION

The present invention relates to a fuel container comprising a fuel container body and a molded component mounted on the fuel container, the molded component comprising a barrier resin (A) having a solubility parameter (calculated from the Fedors' equation) of more than 11 and a thermoplastic resin (B) having a solubility parameter (calculated from the Fedors' equation) of not more than 11, the barrier resin (A) and the thermoplastic resin (B) being mixed or laminated.

In a preferable embodiment, the molded component is a single layered molded component that is molded from a blended resin composition 5 to 70% by weight (hereinafter referred to as wt %) of the barrier resin (A) and 30 to 95 wt % of the thermoplastic resin (B).

In a preferable embodiment, a gasoline permeation amount of the barrier resin (A) is not more than 100 g·20 μm/m²·day (measured at 40° C.–65% RH).

In a preferable embodiment, the barrier resin (A) is at least one selected from the group consisting of polyvinyl alcohol resin, polyamide and aliphatic polyketone.

In a preferable embodiment, the barrier resin (A) is an ethylene-vinyl alcohol copolymer having an ethylene content of 5 to 60% by mol (hereinafter referred to as mol %) and a degree of saponification of at least 85%.

In another preferable embodiment, the thermoplastic resin (B) is a polyolefin resin.

In a preferable embodiment, the polyolefin resin is selected from the group consisting of a saponified ethylene-vinyl acetate copolymer having an ethylene content of 70 to 99 mol % and a degree of saponification of at least 40%, carboxylic acid-modified polyolefin and boronic acid-modified polyolefin.

In another preferable embodiment, the thermoplastic resin (B) comprises a compatibilizer (C) and a thermoplastic resin (D) having a solubility parameter (calculated from the Fedors' equation) of not more than 11 other than the compatibilizer (C), and a blending ratio of components, (A), (C) and (D) is 5 to 70 wt % for (A), 1 to 85 wt % for (C), and 10 to 94 wt % for (D).

In a more preferable embodiment, the compatibilizer (C) is selected from the group consisting of a saponified ethylene-vinyl acetate copolymer having an ethylene content of 70 to 99 mol % and a degree of saponification of at least 40%, carboxylic acid-modified polyolefin and boronic acid-modified polyolefin.

In a preferable embodiment, the compatibilizer (C) is a resin composition comprising 2 to 98 wt % of polyamide and 2 to 98 wt % of carboxylic acid-modified polyolefin.

In a preferable embodiment, the thermoplastic resin (D) is polyethylene having a density of at least 0.93 g/cm³.

In a more preferable embodiment, the whole or a part of the molded component is formed by injection molding.

In a preferable embodiment, the molded component is a multilayered molded component having a multilayered structure and comprising the barrier resin (A) and the thermoplastic resin (B), the barrier resin being at least one selected from the group consisting of polyvinyl alcohol resin, polyamide and aliphatic polyketone.

In a preferable embodiment, the barrier resin (A) is an ethylene-vinyl alcohol copolymer (A1) having an ethylene content of 5 to 60 mol % and a degree of saponification of at least 85%.

In another preferable embodiment, the barrier resin (A) is a resin composition comprising 10 to 80 wt % of ethylene-vinyl alcohol copolymer, 1 to 90 wt % of a compatibilizer (C) and 0 to 89 wt % of a thermoplastic resin (D) having a solubility parameter (calculated from the Fedors' equation) of not more than 11 other than (A) or (C).

In another preferable embodiment, the compatibilizer (C) is selected from the group consisting of a saponified ethylene-vinyl acetate copolymer having an ethylene content of 70 to 99 mol % and a degree of saponification of at least 40%, carboxylic acid-modified polyolefin and boronic acid-modified polyolefin.

In a preferable embodiment, the compatibilizer (C) is a resin composition comprising 2 to 98 wt % of polyamide and 2 to 98 wt % of carboxylic acid-modified polyolefin.

In a preferable embodiment, the thermoplastic resin (B) is a polyolefin resin.

In a preferable embodiment, the thermoplastic resin (B) comprises polyethylene having a density of at least 0.93 g/cm³.

In a more preferable embodiment, the thermoplastic resin (B) is selected from the group consisting of a saponified ethylene-vinyl acetate copolymer having an ethylene content of 70 to 99 mol % and a degree of saponification of at least 40%, carboxylic acid-modified polyolefin and boronic acid-modified polyolefin.

In a more preferable embodiment, the thermoplastic resin (B) is a resin composition comprising 1 to 99 wt % of a compatibilizer (C) selected from the group consisting of a saponified ethylene-vinyl acetate copolymer having an ethylene content of 70 to 99 mol % and a degree of saponification of at least 40%, carboxylic acid-modified polyolefin and boronic acid-modified polyolefin, and 1 to 99 wt % of a thermoplastic resin (D) having a solubility parameter (calculated from the Fedors' equation) of not more than 11 other than (C).

In a more preferable embodiment, at least one layer of the barrier resin (A) layer or the thermoplastic resin (B) layer contains 1 to 50 wt % of inorganic filter.

In a preferable embodiment, the molded component is molded with a multilayer injection molding machine, a two-color molding machine, or a co-injection molding machine.

In a more preferable embodiment, the molded component is mounted on a fuel container body via the thermoplastic resin (B) layer.

In a preferable embodiment, the molded component is a connector for a fuel container, a cap for a fuel container or a valve for a fuel container.

In a preferable embodiment, the molded component is mounted on a fuel container body by thermal fusion.

Furthermore, the present invention relates to a fuel container where a component formed of a thermosetting resin (E) is mounted on a fuel container including a fuel container body and a molded component mounted on the fuel container body, the molded component obtained by mixing or laminating the barrier resin (A) and the thermoplastic resin (B), and the component formed of the thermoplastic resin (E) is mounted on the fuel container via the molded component.

In a preferable embodiment, the thermosetting resin (E) is polymethylene oxide.

The above-described present invention provides a molded component for a fuel container providing excellent performance in gasoline barrier properties, thermal fusion properties and mechanical strength, and thus solves the above problems.

BEST MODE FOR CARRYING OUT THE INVENTION

Figure 1:
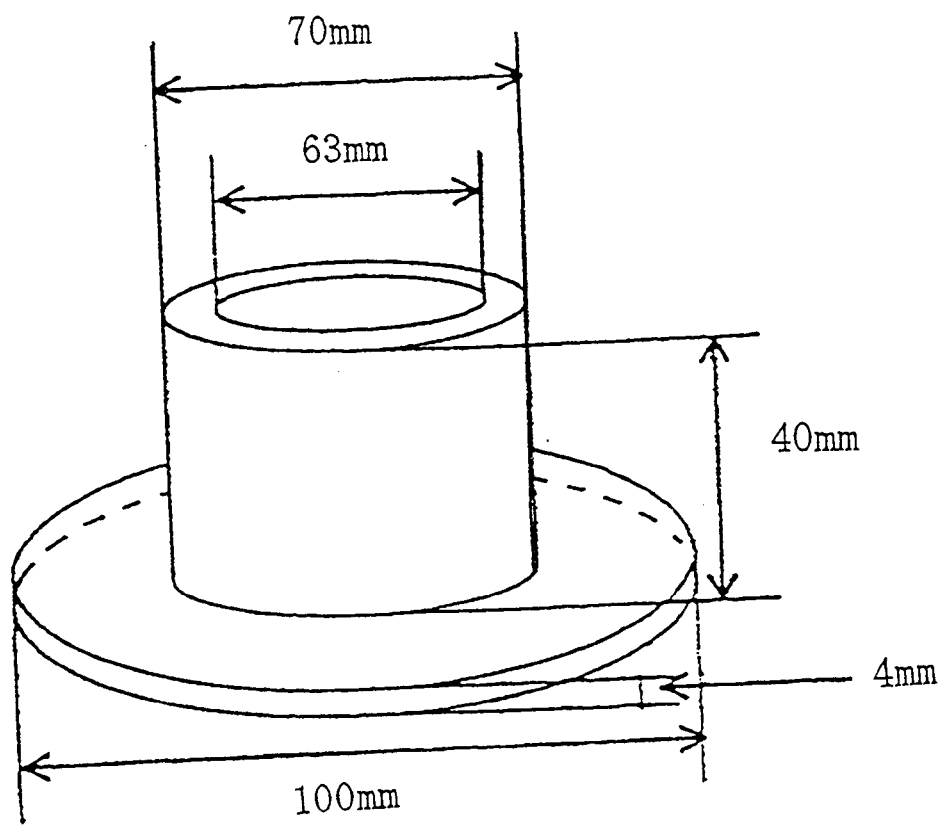
FIG. 1 is a view showing a cylindrical injection-molded article (connector-like molded article).

The present invention relates to a fuel container provided with a molded component mounted on a fuel container body, the molded component obtained by mixing or laminating a barrier resin (A) and a thermoplastic resin (B), the barrier resin (A) having a solubility parameter (calculated from the Fedors' equation) of more than 11, and the thermoplastic resin (B) having a solubility parameter (calculated from the Fedors' equation) of not more than 11.

"Fuel" in connection with a fuel container of the present invention includes not only gasoline, but also so-called oxygen-containing gasoline such as alcohol-containing gasoline (gasoline containing alcohol such as methanol) and MTBE (methyl tertiary butyl ether)-containing gasoline.

Barrier Resin (A)

The barrier resin (A) used in the present invention has a solubility parameter (calculated from the Fedors' equation) of more than 11 and has good barrier properties with respect to fuel filled in a fuel container of the present invention. It is preferable that the barrier resin (A) has a gasoline permeation amount of 100 g·20 $\mu$m/m$^2$·day (measured at 40° C. and 65% RH) or less. The upper limit of the gasoline permeation amount is preferably 10 g·20 $\mu$m/m$^2$·day or less, more preferably 1 g·20 $\mu$m/m$^2$·day or less, even more preferably 0.5 g·20 $\mu$m/m$^2$·day or less, and most preferably 0.1 g·20 $\mu$m/m$^2$·day or less. The gasoline used for measurement of the gasoline permeation amount is a model gasoline called Ref. C comprising toluene and iso-octane at a volume fraction of 1/1.

Examples of the barrier resin (A) used in the present invention include polyvinyl alcohol resin (A1), polyamide (A2) and aliphatic polyketone (A3). These resins can be used alone or in combination. Among these resins, polyvinyl alcohol resin (A1) and polyamide (A2) are preferable as the barrier resin (A) in view of gasoline barrier properties, and polyvinyl alcohol resin (A1) is most preferable.

In the present invention, "polyvinyl alcohol resin" refers to a resin obtained by saponifying a vinyl ester polymer or a copolymer of a vinyl ester and another monomer with an alkaline catalyst or the like.

The degree of saponification of the vinyl ester component of the polyvinyl alcohol resin (A1) used in the present invention is preferably 90% or more, more preferably 95% or more, and most preferably 99% or more. A degree of saponification of less than 90% may reduce the gas barrier properties under high humidities, and may result in insufficient gasoline barrier properties. The polyvinyl alcohol resin (A1) may be a mixture of two or more kinds of polyvinyl alcohol resins having different degree of saponifications. In this case, the average calculated based on the mixing ratio by weight is used as the degree of saponification. The degree of saponification of such a polyvinyl alcohol resin (A1) can be obtained by nuclear electromagnetic resonance (NMR) analysis.

A preferable polyvinyl alcohol resin (A1) used in the present invention is ethylene-vinyl alcohol copolymer (EVOH), because of its applicability to melt-molding, good gas barrier properties under high humidities and excellent gasoline barrier properties.

A preferable EVOH can be obtained by saponifying an ethylene-vinyl ester copolymer. In particular, an ethylene-vinyl alcohol copolymer having an ethylene content of 5 to 60 mol % and a degree of saponification of 85% or more is preferable. The lower limit of the ethylene content of the EVOH is preferably 15 mol % or more, more preferably 20 mol % or more, and most preferably 25 mol % or more. The upper limit of the ethylene content is preferably 55 mol % or less, and more preferably 50 mol % or less. An ethylene content of less than 5 mol % may deteriorate the melt moldability, and may reduce the water resistance and the hot water resistance. On the other hand, an ethylene content of more than 60 mol % may result in insufficient barrier properties. The degree of saponification of the vinyl ester is preferably 85% or more, more preferably 90% or more, and most preferably 99% or more. A degree of saponification of less than 85% may result in insufficient gasoline barrier properties and thermal stability.

A typical example of a vinyl ester used for production of the EVOH is vinyl acetate, and other vinyl esters such as fatty acid vinyl ester (e.g., vinyl propionate, vinyl pivalate, etc.) also can be used. The EVOH can contain 0.0002 to 0.2 mol % of a vinyl silane compound as a copolymer. Examples of such a vinyl silane compound include vinyl trimethoxysilane, vinyl triethoxysilane, vinyl tri(β-methoxy-ethoxy) silane, and γ-methacryloxypropylmethoxysilane. Among these, vinyl trimethoxysilane or vinyl triethoxysilane is preferably used. Furthermore, other copolymers, for example, propylene, butylene or unsaturated carboxylic acids such as (meth) acrylic acid, methyl (meth)acrylate and ethyl (meth)acrylate or esters thereof, and vinyl pyrolidones such as N-vinyl pyrolidone can be copolymerized, as long as the achievement of the object of the present invention is not inhibited.

Furthermore, a boron compound can be blended with the EVOH, as long as the achievement of the object of the present invention is not inhibited. Examples of such a boron compound include boric acids, boric esters, borates, boron hydrides, or the like. More specifically, examples of the boric acids include orthoboric acid, metaboric acid, and tetraboric acid. Examples of the boric esters include triethyl borate, and trimethyl borate, and examples of the borates include alkali metal salts and alkaline earth metal salts of various boric acids as listed above, and borax. Among these compounds, orthoboric acid (which hereinafter may be referred to simply as "boric acid") is preferable.

When a boron compound is blended, the content of the boron compound is preferably 20 to 2000 ppm in terms of the boron element, and more preferably 50 to 1000 ppm. This range allows for an EVOH with reduced torque non-uniformity in a heating and melting process. A content of less than 20 ppm hardly attains such an effect, and a content of more than 2000 ppm may lead to gel formation, resulting in poor moldability in some cases.

Furthermore, it is preferable to incorporate alkali metal salt in an amount of 5 to 5000 ppm in terms of the alkali metal element into the EVOH used in the present invention for the purpose of improving the compatibility.

A more preferable content of the alkali metal salt is 20 to 1000 ppm in terms of the alkali metal element, and even more preferably 30 to 500 ppm. Examples of the alkali metals include lithium, sodium and potassium. Preferable examples of the alkali metal salts include aliphatic carboxylic acid salts, aromatic carboxylic acid salts, phosphates, metal complexes of univalent metals or the like, such as sodium acetate, potassium acetate, sodium stearate, potassium stearate, and sodium salt of ethylenediamine tetraacetic acid. Among these, sodium acetate or potassium acetate is more preferable.

Furthermore, it is preferable that the EVOH used in the present invention contains a phosphorus compound in an amount of 2 to 200 ppm, more preferably 3 to 150 ppm, and most preferably 5 to 100 ppm in terms of the phosphorus element. A concentration of the phosphorus in the EVOH of less than 2 ppm or more than 200 ppm may cause a problem with regard to the melt moldability or the thermal stability. In particular, such a concentration easily causes the formation of gel-like fisheyes or coloring problems when subjected to melt-molding over a long period.

The type of the phosphorus compound incorporated into the EVOH is not limited to particular types. A variety of acids such as phosphoric acid and phosphorous acid or salts thereof can be used. The phosphate can be contained in any of the forms of monobasic phosphate, dibasic phosphate and tribasic phosphate, and the cation thereof is not limited to a particular type, but alkali metal salts and alkaline earth metal salts are preferable. Among these, it is preferable to add the phosphorus compound in the form of sodium dihydrogen phosphate, potassium dihydrogen phosphate, disodium hydrogen-phosphate, or dipotassium hydrogen phosphate. Among these, sodium dihydrogen phosphate or potassium dihydrogen phosphate is most preferable.

Furthermore, a thermal stabilizer, an ultraviolet absorber, an antioxidant, a colorant, other resins (e.g., polyamide or polyolefin), or a plasticizer such as glycerin and glycerin monostearate can be blended to the EVOH, as long as the achievement of the object of the present invention is not inhibited. Furthermore, it is advantageous to add a metal salt of higher aliphatic carboxylic acid or a hydrotalcite compound because this prevents the EVOH from being deteriorated by heat.

A preferable melt flow rate (MFR) (at 190° C. and a load of 2160 g) of the EVOH used in the present invention is 0.1 to 50 g/10 min, more preferably 0.3 to 40 g/10 min, and even more preferably 0.5 to 30 g/10 min. The melt flow rate of an EVOH having a melting point in the vicinity of 190° C. or more than 190° C. is obtained in the following manner. The melt flow rates are measured at a plurality of temperatures higher than the melting point under a load of 2160 g. The inverse numbers of the absolute temperatures are plotted on the horizontal axis of a semilogarithmic graph, and the logarithm of the MFR is plotted on the vertical axis. Then, a value extrapolated to 190° C. is taken as the MFR. The EVOH resins can be used alone or in combination of two or more.

The polyamide (A2) used as the barrier resin (A) of the present invention is a polymer having an amide bond. Examples thereof include homopolymers such as polycaproamide (Nylon-6), polyundecanamide (Nylon-11), polylauryllactam (Nylon-12), polyhexamethylene adipamide (Nylon-6,6), and polyhexamethylene sebacamide (Nylon-6, 12), caprolactam/lauryllactam copolymer (Nylon-6/12), caprolactam/aminoundecan acid copolymer (Nylon-6/11), caprolactam/ω-aminononanoic acid copolymer (Nylon-6/9), caprolactam/hexamethylene diammonium adipate copolymer (Nylon-6/6,6), caprolactam/hexamethylene diammonium adipate/hexamethylene diammonium sebacate copolymer (Nylon-6/6,6/6,12), a polymer of adipic acid and metaxylylene diamine or aromatic nylon, which is a polymer of hexamethylene diamine and m,p-phthalic acid. These polyamides can be used alone or in combination of two or more. Among these polyamides, Nylon-6 is preferable because of its good gasoline barrier properties.

The aliphatic polyketone (A3) used as the barrier resin (A) of the present invention is a carbon monoxide-ethylene copolymer. The carbon monoxide-ethylene copolymer can be obtained by copolymerizing carbon monoxide with ethylene or by copolymerizing carbon monoxide and ethylene, which are used as main components, with an unsaturated compound other than ethylene. Examples of the unsaturated compound other than ethylene include α-olefins having three or more carbon atoms, styrenes, dienes, vinyl esters, aliphatic unsaturated carboxylic acid esters. The copolymer includes random copolymer and alternating copolymer. An alternating copolymer is preferable because of its higher crystallinity, which leads to good barrier properties.

Among the alternating copolymers, an alternating copolymer obtained by copolymerization with a third component other than carbon monoxide or ethylene is preferable because of its lower melting point, which leads to good melt stability. Preferable examples of a monomer used for the copolymerization include α-olefins, such as propylene, butene-1, isobutene, pentene-1, 4-methylpentene-1, hexene-1, octene-1, and dodecene-1. Among these, an α-olefin having 3 to 8 carbon atoms is preferable, and propylene is most preferable. The amount of the α-olefin used for the copolymerization is preferably 0.5 to 7 wt % with respect to polyketone to ensure appropriate crystallinity and melt stability.

Preferable examples of a diene used for the copolymerization include dienes having 4 to 12 carbon atoms, such as butadiene, isopropylene, 1, 5-hexadiene, 1,7-octadiene, and 1,9-decadiene. Examples of vinyl esters include vinyl acetate, vinyl propionate, and vinyl pivalate. Examples of aliphatic unsaturated carboxylic acids, salts thereof and esters thereof include acrylic acid, methacrylic acid, maleic anhydride, maleic acid, itaconic acid, acrylic acid ester, methacrylic acid ester, maleic acid monoester, maleic acid diester, fumaric acid monoester, fumaric acid diester, itoconic acid monoester, itaconic acid diester (these esters include alkyl esters such as methyl esters and ethyl esters), acrylic acid salt, maleic acid salt, and itaconic acid salt (these salts include monovalent or bivalent metal salts). These monomers for the copolymerization can be used alone or in combination of two or more.

Non-limiting examples of a method for producing the aliphatic polyketone (A3) include known methods, such as those disclosed in U.S. Pat. No. 2,495,286, and Japanese Laid-Open Patent Publication Nos. 53-128690, 59-197427, 61-91226, 62-232434, 62-53332, 63-3025, 63-105031, 63-154737, 1-149829, 1-201333, and 2-67319.

The melt flow rate (MFR) of the aliphatic polyketone used in the present invention is preferably 0.01 to 50 g/10 min (at 230° C. and 2160 g load), and most preferably 0.1 to 10 g/10 min. When the MFR is in the range as above, the resin has excellent flowability and the moldability becomes excellent.

Thermoplastic Resin (B)

Examples of the thermoplastic resin (B) having a solubility parameter (calculated from the Fedors' equation) of 11 or less as used in the present invention include polyolefin resins, styrene resins, and polyvinyl chloride resins. A molded component for a fuel container is usually mounted on a fuel container made of a thermoplastic resin by thermal fusion because of its simplified working process. In general, a polyolefin resin, preferably, high density polyethylene is used for the outermost layer of the fuel container body made of thermoplastic resin to provide sufficient mechanical strength. Such a polyolefin resin has a solubility parameter of 11 or less. When the solubility parameter of the thermoplastic resin (B) exceeds 11, the thermal fusion between the fuel container body and the molded component for the fuel container are insufficient, so that sufficient performance of the fuel container of the present invention cannot be provided. These examples of the thermoplastic resin (B) can be used alone or in combination of two or more.

Among these examples of the thermoplastic resin (B), it is preferable to use polyolefin resin because of its thermal fusion properties to the fuel container body.

Examples of the polyolefin resin include homopolymers of α-olefins such as high density, low density or very low density polyethylene, carboxylic acid-modified polyolefins, boronic acid-modified polyolefins, polypropylene, and polybutene-1, and copolymers of α-olefins selected from the group consisting of ethylene, propylene, butene-1, and hexene-1. Examples thereof also include α-olefins copolymerized with diolefin, vinyl compounds such as vinyl chloride and vinyl acetate, and unsaturated carboxylic acid esters such as acrylic acid ester and methacrylic acid ester. Examples of styrene resins include polystyrene, acrylonitrile-butadiene-styrene copolymer resin (ABS), acrylonitrile-styrene copolymer resin (AS), block copolymers with styrene-isobutylene, copolymers with styrene-butadiene and block copolymers with styrene-isoprene.

Among the above-listed polyolefin resins, polyethylene having a density of 0.93 g/cm$^3$ or more, a saponified ethylene-vinyl acetate copolymer having an ethylene content of 70 to 99 mol % and a degree of saponification of 40% or more, a carboxylic acid-modified polyolefin, and boronic acid-modified polyolefin are preferable.

The saponified ethylene-vinyl acetate copolymer having an ethylene content of 70 to 99 mol % and a degree of saponification of the vinyl acetate component of 40% or more preferably has an ethylene content of 72 to 96 mol %, more preferably 72 to 94 mol % to improve the compatibility. The degree of saponification of the vinyl acetate component is preferably 45% or more. There is no particular upper limit, and a degree of saponification of substantially 100% can be used.

Preferably, the saponified ethylene-vinyl acetate copolymer having an ethylene content of 70 to 99 mol % and a degree of saponification of the vinyl acetate component of 40% or more is used with the barrier resin (A) mixed thereto, most preferably with EVOH mixed thereto. When the degree of saponification of the vinyl acetate component is less than 40% or the ethylene content exceeds 99 mol %, the compatibility with EVOH is deteriorated, so that the moldability may become poor. When the ethylene content is less than 70 mol %, the thermal fusion properties between the molded component for the fuel container and the fuel container body is insufficient.

The melt flow rate (MFR) (at 210° C. and a 2160 g load) of the saponified ethylene-vinyl acetate copolymer having an ethylene content of 70 to 99 mol % and a degree of saponification of the vinyl acetate component of 40% or more is preferably 0.1 g/10 min or more, more preferably 0.5 g/10min or more and not more than 100 g/10 min, even more preferably 50 g/10 min or less, and most preferably 30 g/10 min or less.

The carboxylic acid-modified polyolefin used in the present invention is a copolymer of an olefin, in particular, α-olefin and unsaturated carboxylic acids or anhydrides thereof, and includes polyolefin having a carboxylic group in its molecule and polyolefin in which all or some of the carboxylic groups contained in the polyolefin are present in the form of a metal salt. Examples of polyolefins used for the carboxylic acid-modified polyolefin include various kinds of polyolefins such as polyethylene (e.g., low density polyethylene (LDPE), linear low density polyethylene (LLDPE) and very low density polyethylene (VLDPE)), polypropylene, copolymerized polypropylene, ethylene-vinyl acetate copolymer, and ethylene-(meth)acrylic acid ester copolymer.

Preferable examples of the unsaturated carboxylic acid include acrylic acid, methacrylic acid, ethacrylic acid, maleic acid, monomethyl maleate, monoethyl maleate, and itaconic acid. In particular, acrylic acid or methacrylic acid is preferable. The content of the unsaturated carboxylic acid is preferably 0.5 to 20 mol %, more preferably 2 to 15 mol %, and most preferably 3 to 12 mol %. Examples of unsaturated carboxylic anhydrides include itaconic anhydride and maleic anhydride, and maleic anhydride is preferable. The content of the unsaturated carboxylic anhydride is preferably 0.0001 to 5 mol %, more preferably 0.0005 to 3 mol %, and most preferably 0.001 to 1 mol %. Examples of other monomers that can be contained in the copolymer include vinyl esters such as vinyl acetate and vinyl propionate, unsaturated carboxylic acid esters such as methyl acrylate, ethyl acrylate, isopropyl acrylate, isobutyl acrylate, n-butyl acrylate, 2-ethylhexyl acrylate, methyl methacrylate, isobutyl methacrylate, and diethyl maleate, and carbon monoxide.

Examples of metal ions in a metal salt of carboxylic acid-modified polyolefin include alkali metals such as lithium, sodium and potassium, alkaline earth metals such as magnesium and calcium, and transition metals such as zinc. In particular, zinc is preferable because of its compatibility. The neutralization degree in the metal salt of the carboxylic acid-modified polyolefin is preferably 100% or less, more preferably 90% or less, and most preferably 70% or less. The lower limit of the neutralization degree is preferably 5% or more, more preferably 10% or more, and most preferably 30% or more.

The melt flow rate (MFR) (at 190° C. and a load of 2160 g) of the carboxylic acid-modified polyolefin used in the present invention is preferably 0.01 to 50 g/10 min, more preferably 0.05 to 30 g/10 min, and most preferably 0.1 to 10 g/10 min. These examples of the carboxylic acid-modified polyolefin can be used alone or in combination of two or more.

The boronic acid-modified polyolefin used in the present invention is a polyolefin having at least one functional group selected from the group consisting of a boronic acid group, a borinic acid group, and a boron-containing group that can be converted to a boronic acid or a borinic acid in the presence of water.

The polyolefin having at least one functional group selected from the group consisting of a boronic acid group, a borinic acid group, and a boron-containing group that can be converted to a boronic acid or a borinic acid in the presence of water is a polyolefin to which at least one functional group selected from the group consisting of a boronic acid group, a borinic acid group, and a boron-containing group that can be converted to a boronic acid or a borinic acid in the presence of water is bonded to its principal chain, side chain or terminal by the boron-carbon bond. In particular, a polyolefin bonded to the functional group at its side chain or terminal is preferable, and a polyolefin bonded thereto at its terminal is most preferable. Herein, "terminal" means one terminal or both terminals. The carbon in the boron-carbon bond is derived from the base polymer of the polyolefin, which is described later, or derived from a boron compound that is reacted with the base polymer. Preferable examples of the boron-carbon bond include a bond of boron and an alkylene group at the principal chain, terminal or side chain. In the present invention, a polyolefin having a boronic acid group is preferable, as will be described below. In the present invention, boronic acid groups are represented by the following formula (I):

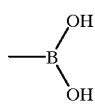

(I)

The boron-containing group that can be converted to a boronic acid group in the presence of water (hereinafter, simply referred to as boron-containing group) can be any boron-containing group, as long as it can be converted to a boronic acid group represented by the above formula (I) by hydrolysis in the presence of water. Typical examples include a boron ester group represented by the following formula (II), a boronic anhydride group represented by the following formula (III), and a boronic acid salt group represented by the following formula (IV).

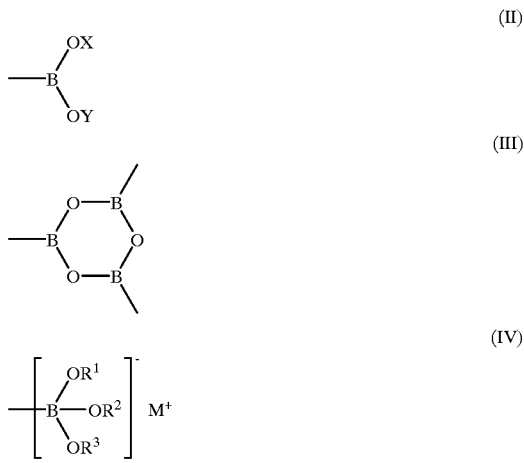

In the above formulae, X and Y are hydrogen atoms, aliphatic hydrocarbon groups (e.g., linear or branched alkyl groups having 1 to 20 carbon atoms, or alkenyl groups having 1 to 20 carbon atoms), alicyclic hydrocarbon groups (e.g., cycloalkyl groups, cycloalkenyl groups, etc.), or aromatic hydrocarbon groups (e.g., phenyl groups, biphenyl groups, etc.). X and Y may be the same group, or different groups. X and Y may be bonded, except when both X and Y are hydrogen atoms. $R^1$, $R^2$ and $R^3$ are hydrogen atoms, aliphatic hydrocarbon groups, alicyclic hydrocarbon groups, or aromatic hydrocarbon groups, as X and Y. $R^1$, $R^2$ and $R^3$ may be the same group, or different groups. M is an alkali metal or alkaline earth metal. X, Y, $R^1$, $R^2$ and $R^3$ may have another group, for example, a carboxyl group, a halogen atom or the like.

Specific examples of the boronic acid esters represented by formulae (II) to (IV) include boronic acid ester groups such as a boronic acid dimethyl ester group, a boronic acid diethyl ester group, a boronic acid dipropyl ester group, a boronic acid disopropyl ester group, a boronic acid dibutyl ester group, a boronic acid dihexyl ester group, a boronic acid dicyclohexyl group, a boronic acid ethylene glycol ester group, a boronic acid propylene glycol ester group (a boronic acid 1,2-propane diol ester group, a boronic acid 1,3-propane diol ester group), a boronic acid trimethylene glycol ester group, a boronic acid neopentyl glycol ester group, a boronic acid catechol ester group, a boronic acid glycerin ester group, and a boronic acid trimethylol ethane ester group; a boronic anhydride group; a group of alkali metal salt of boronic acid, and a group of alkaline earth metal salt of boronic acid. Among these functional groups, a boronic acid ester group such as a boronic acid ethylene glycol ester group is most preferable because of its good compatibility with EVOH. The boron-containing group that can be converted to a boronic acid group or a borinic acid group in the presence of water refers to a group that can be converted to a boronic acid group or a borinic acid group when a polyolefin is hydrolyzed in water or a mixed liquid of water and an organic solvent (toluene, xylene, acetone or the like) for a reaction time of 10 minutes to 2 hours at a reaction temperature of 25° C. to 150° C.

The content of the functional group is not limited to a particular amount, but it is preferably 0.0001 to 1 meq/g (milliequivalent/g), and more preferably 0.001 to 0.1 meq/g.

It is surprising that the presence of such a small amount of functional group significantly improves the compatibility of the resin composition.

Examples of the base polymer of the boron-containing group of polyolefin include olefin monomers typified by α-olefins such as ethylene, propylene, 1-butene, isobutene, 3-methyl pentene, 1-hexene, and 1-octene.

The base polymer is used in the form of a polymer of one, two or three or more of these monomers. Among these base polymers, in particular, ethylene polymer (very low density polyethylene, low density polyethylene, medium density polyethylene, high density polyethylene, linear low density polyethylene, ethylene-vinyl acetate copolymer, ethylene-acrylic acid ester copolymer, a metal salt of ethylene-acrylic acid copolymer (Na, K, Zn based ionomer), ethylene-propylene copolymer) is preferable.

Next, a typical method for producing an olefin polymer having a boronic acid group and a boron-containing group used in the present invention will be described. The olefin polymer having a boronic acid group or a boron-containing group that can be converted to a boronic acid group in the presence of water can be obtained in the following manner. An olefin polymer having a carbon-carbon double bond is reacted with a boran complex and boronic acid trialkyl ester in a nitrogen atmosphere so that an olefin polymer having a boronic acid dialkyl ester group is obtained. Thereafter, the olefin polymer is reacted with water or alcohol. In this method, when an olefin polymer having a double bond at its terminal is used as the material, an olefin polymer having a boronic acid group or a boron-containing group that can be converted to a boronic acid group in the presence of water at its terminal can be obtained. When an olefin polymer having a double bond at its side chain or principal chain is used as the material, an olefin polymer having a boronic acid group or a boron-containing group that can be converted to a boronic acid group in the presence of water at its side chain can be obtained.

Typical methods for producing an olefin polymer having a double bond as the raw material includes (1) utilizing a double bond that is present in a trace amount at the terminal of a regular olefin polymer; (2) obtaining an olefin polymer having a double bond at the terminal by pyrolyzing an olefin polymer under no oxygen; and (3) obtaining a copolymer of an olefin monomer and a diene monomer by copolymerizing the olefin monomer and the diene polymer. In the method (1), a known method for producing an olefin polymer can be used. In particular, a method in which hydrogen is not used as a chain transfer agent, and a metallocene based polymerization catalyst is used as a polymerization catalyst (e.g., DE4030399) is preferable. In the method (2), an olefin polymer is pyrolyzed at a temperature of 300° C. to 500° C. under no oxygen, for example, in a nitrogen atmosphere or under a vacuum, by a known method (e.g., U.S. Pat. No. 2,835,659, U.S. Pat. No. 3,087,922). In the method (3), a method for producing an olefin-diene polymer using a known Ziegler-Natta catalyst (e.g., Japanese Laid-Open Patent Publication No. 50-44281, DE3021273) can be used.

Preferable examples of the boran complex include a boran-tetrahydrofuran complex, a boran-dimethyl sulfide complex, boran-pyridine complex, a boran-trimethyl amine complex, and a boran-triethyl amine complex. Among these, a boran-triethyl amine complex and a boran-trimethyl amine complex are preferable. The amount of the boran complex to be fed is preferably in the range from ⅓ equivalent to 10 equivalents with respect to the double bonds of the olefin polymer. Preferable examples of the boronic acid trialkyl ester include boronic acid lower alkyl esters such as trimethyl borate, triethyl borate, tripropyl borate, and tributyl borate. The amount of the boronic acid trialkyl ester to be fed is preferably in the range from 1 equivalent to 100 equivalents with respect to the double bonds of the olefin polymer. A solvent is not required to be used. When used, saturated hydrocarbon solvents such as hexane, heptane, octane, decane, dodecane, cyclohexane, ethylcyclohexane, and decalin are preferable.

The reaction for incorporation is effected at a reaction temperature of 25° C. to 300° C., preferably 100 to 250° C., and for 1 minute to 10 hours, preferably 5 minutes to 5 hours.

The reaction with water or alcohol is effected under the following conditions. Generally, an organic solvent such as toluene, xylene, acetone, and ethyl acetate is used as a reaction solvent. Water or alcohol such as methanol, ethanol, and butanol; polyhydric alcohol such as ethylene glycol, 1,2-propane diol, 1,3-propane diol, neopentyl glycol, glycerin, trimethylol ethane, pentaerythritol, and dipentaerythritol is used in an significantly excessive amount of 1 to 100 equivalents or more with respect to a boronic acid group. The reaction is effected at a temperature of 25° C. to 150° C. for about 1 minute to 1 day. The boron-containing group that can be converted to a boronic acid group of the above-listed functional groups refers to a group that can be converted to a boronic acid group when hydrolysis is effected in water or a mixed solvent of water and an organic solvent (toluene, xylene, acetone or the like) for 10 minutes to 2 hours at a temperature of 25° C. to 150° C.

A preferable melt flow rate (MFR) (at 190° C. and a load of 2160 g) of the thermoplastic resin (B) used in the present invention is 0.01 to 100 g/10 min, more preferably 0.03 to 50 g/10 min, and most preferably 0.1 to 30 g/10 min. The melt flow rate of a thermoplastic resin having a melting point in the vicinity of 190° C. or more than 190° C. is obtained in the following manner. The melt flow rates are measured at a plurality of temperatures higher than the melting point under a load of 2160 g. The inverse numbers of the absolute temperatures are plotted on the horizontal axis of a semi-logarithmic graph, and the logarithm of the MFR is plotted on the vertical axis. Then, a value extrapolated to 190° C. is taken as the MFR.

Compatibilizer (C)

The fuel container of the present invention includes a fuel container body and a molded component mounted on the fuel container body, the molded component comprising the barrier resin (A) and the thermoplastic resin (B) in the form of a blend or a laminate.

When the molded component is formed of a blended resin composition comprising the barrier resin (A) and the thermoplastic resin (B), it is preferable that the thermoplastic resin (B) comprises a compatibilizer (C) and a thermoplastic resin (D) having a solubility parameter (calculated from the Fedors' equation) of 11 or less other than the compatibilizer (C), and that the blending ratio of components, (A), (C) and (D) is 5 to 70 wt % for (A), 1 to 85 wt % for (C), and 10 to 94 wt % for (D). Such a feature improves the compatibility between the barrier resin (A) layer and the thermoplastic resin (D) and can provide the resulting resin composition with stable morphology.

When the molded component comprises the barrier resin (A) and the thermoplastic resin (B) in the form of a laminate, the adhesion between the layers of the obtained multilayered molded component (for a fuel container) can be improved by incorporating the compatibilizer (C) into the barrier resin (A) layer or using a resin composition comprising the compatibilizer (C) and the thermoplastic resin (D) having a solubility parameter (calculated from the Fedors' equation) of 11 or less other than the compatibilizer (C) for the thermoplastic resin (B).

Although there is no particular limitation regarding the compatibilizer (C), preferable examples thereof include a saponified ethylene-vinyl acetate copolymer (C1) having an ethylene content of 70 to 99 mol % and a degree of saponification of 40% or more, a carboxylic acid-modified polyolefin (C2), and a boronic acid-modified polyolefin (C3). These examples of the compatibilizer (C) can be used alone or in combination.

When a resin composition comprising the barrier resin (A), the compatibilizer (C) and the thermoplastic resin (D) is used, and polyvinyl alcohol resin (A1), especially EVOH, is used as the barrier resin (A), it is preferable to use a resin composition comprising 2 to 98 wt % of polyamide and 98 to 2 wt % of carboxylic acid-modified polyolefin as the compatibilizer (C). It is preferable to use such a compatibilizer, because it significantly improves the compatibility of the barrier resin (A) and the thermoplastic resin (D), and the impact resistance of the molded component (interlayer adhesion in the case of a multilayered molded component) can be improved.

When the compatibilizer (C) is a resin composition comprising 2 to 98 wt % of polyamide and 98 to 2 wt % of carboxylic acid-modified polyolefin, it is preferable to use a polyamide resin comprising a Nylon 6 component (e.g., Nylon-6, Nylon-6,12, Nylon-6/12, Nylon-6/6,6 or the like) as the polyamide resin used in the compatibilizer (C) because of its compatibility with EVOH. The EVOH and the polyamide resin react in a melt process at a high temperature so as to form a gel. Therefore, in order to suppress heat deterioration of the blended composition, the melting point of the polyamide resin is preferably 240° C. or less, more preferably 230° C. or less.

A preferable melt flow rate (MFR) (at 210° C. and a load of 2160 g) of the polyamide resin used for the compatibility with EVOH is 0.1 to 50 g/10 min, and most preferably 0.5 to 30 g/10 min. The melt flow rate of a polyamide resin having a melting point in the vicinity of 210° C. or more than 210° C. is obtained in the following manner. The melt flow rates are measured at a plurality of temperatures higher than the melting point under a load of 2160 g. The inverse numbers of the absolute temperatures are plotted on the horizontal axis of a semilogarithmic graph, and the logarithm of the MFR is plotted on the vertical axis. Then, a value extrapolated to 210° C. is taken as the MFR.

When a resin composition comprising polyamide and carboxylic acid-modified polyolefin is used as the compatibilizer (C), a polymer obtained by random-copolymerizing polyolefin and unsaturated carboxylic acid or anhydride thereof is preferable as the carboxylic acid-modified polyolefin. A polymer obtained by random-copolymerizing ethylene and unsaturated carboxylic acid or anhydride thereof is more preferable. A random copolymer or a metal salt thereof is more preferable than a graft compound, because a graft compound makes it difficult to provide a large content of acid necessary for the compatibility between the barrier resin (A) and the thermoplastic resin (D) when it is mixed with polyamide. Furthermore, a graft compound of unsaturated carboxylic acid, for example maleic anhydride may not be preferable because a hydroxyl group of EVOH reacts with the carboxyl groups in the graft copolymer and causes gel or fisheyes.

The content of the unsaturated carboxylic acid is preferably 2 to 15 mol %, more preferably 3 to 12 mol %. Preferable examples of the unsaturated carboxylic acid include acrylic acid, methacrylic acid, ethacrylic acid, maleic acid, monomethyl maleate, monoethyl maleate, and maleic anhydride. In particular, acrylic acid or methacrylic acid is preferable. Examples of other monomers that can be contained in the copolymer include vinyl ester such as vinyl acetate and vinyl propionate, unsaturated carboxylic acid ester such as methyl acrylate, ethyl acrylate, isopropyl acrylate, isobutyl acrylate, n-butyl acrylate, 2-ethylhexyl acrylate, methyl methacrylate, isobutyl methacrylate, and diethyl maleate, and carbon monoxide. For the resin composition with which a molded component for a fuel container used in the fuel container of the present invention is formed, a metal salt of carboxylic acid polyolefin is more preferable than a carboxylic acid-modified polyolefin. The reason why a metal salt of carboxylic acid-modified polyolefin is more preferable than a carboxylic acid-modified polyolefin has not been determined. However, it may be because the compatibility with polyamide resin is increased, since the metal salt has a higher polarity.

Examples of metal ions in a metal salt of carboxylic acid-modified polyolefin include alkali metals such as lithium, sodium and potassium, alkaline earth metals such as magnesium and calcium, and transition metals such as zinc. In particular, zinc is preferable because of its compatibility with polyamide resin. The neutralization degree in a metal salt of the carboxylic acid polyolefin is preferably 100% or less, more preferably 90% or less, and most preferably 70% or less. The lower limit of the neutralization degree is preferably 5% or more, more preferably 10% or more, and most preferably 30% or more.

Thermoplastic Resin (D)

Examples of the thermoplastic resin (D) include polyolefin resins, styrene resins, and polyvinyl chloride resins. Among these, polyolefin resins are most preferable in view of the thermal fusion properties of the molded component and economical advantages. When the solubility parameter of the thermoplastic resin (D) exceeds 11, the thermal fusion properties of the molded component for the fuel container of the present invention with respect to the fuel container body is insufficient.

Examples of the polyolefin resins include homopolymers of α-olefins such as high density or low density polyethylene, polypropylene, and polybutene-1, and copolymers of α-olefins selected from the group consisting of ethylene, propylene, butene-1, and hexene-1.

Among these, polyethylene having a density of 0.93 g/cm$^3$ or more is preferable as the thermoplastic resin (D), because it significantly improves the impact resistance and the thermal fusion properties. Since the outermost layer of the fuel container body made of a thermoplastic resin is commonly formed of high density polyethylene, such a feature significantly improves, in particular, the thermal fusion properties. The density of polyethylene is preferably 0.93 g/cm$^3$ or more. A density of less than 0.93 g/cm$^3$ may not sufficiently improve the mechanical strength such as impact resistance.

Method for Kneading a Resin Composition

The resin composition used in the present invention can be obtained easily by melting and mixing the components with a melt-kneading apparatus. The method for blending the components is not limited to a particular method. For example, the following method can be used. The barrier resin (A), the thermoplastic resin (B), the compatibilizer (C) and the thermoplastic resin (D) are blended as appropriate. The blend is melted and kneaded by a single or twin screw extruder or the like, formed into pellets and dried. In the melting and mixing operation, since the blend may be non-uniform, and gels or fisheyes that are generated are mixed in, blending and pelletizing are performed preferably by an extruder having a high kneading degree, and it is preferable to seal the hopper port with nitrogen gas and to extrude the blend at a low temperature.

Resin Additives

The resin composition used in the present invention may contain suitable additives (e.g., thermal stabilizer, a plasticizer, antioxidant, an ultraviolet absorber and a colorant), but these additives can be used within the range not interfering with the effects of the present invention. Furthermore, it is advantageous to add a metal salt of a higher aliphatic carboxylic acid or a hydrotalcite compound in that, when the barrier resin (A) is EVOH, deterioration of the EVOH due to the heat can be prevented.

As the hydrotalcite compound herein, a hydrotalcite compound that is a double salt represented by $M_xAl_y(OH)_{2x+3y-2z}(A)_z \cdot aH_2O$ (M is Mg, Ca or Zn, A is $CO_3$ or $HPO_4$, and x, y, z, and a are positive numbers) can be used. The following hydrotalcite compounds are particularly preferable.

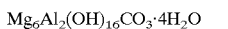
$Mg_6Al_2(OH)_{16}CO_3 \cdot 4H_2O$

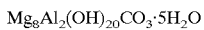
$Mg_8Al_2(OH)_{20}CO_3 \cdot 5H_2O$

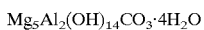
$Mg_5Al_2(OH)_{14}CO_3 \cdot 4H_2O$

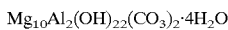
$Mg_{10}Al_2(OH)_{22}(CO_3)_2 \cdot 4H_2O$

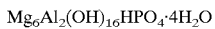
$Mg_6Al_2(OH)_{16}HPO_4 \cdot 4H_2O$

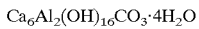
$Ca_6Al_2(OH)_{16}CO_3 \cdot 4H_2O$

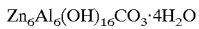
$Zn_6Al_6(OH)_{16}CO_3 \cdot 4H_2O$

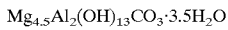
$Mg_{4.5}Al_2(OH)_{13}CO_3 \cdot 3.5H_2O$

Furthermore, as the hydrotalcite compound, $[Mg_{0.75}Zn_{0.25}]_{0.67}Al_{0.33}(OH)_2(CO_3)_{0.167} \cdot 0.45H_2O$, which is a hydrotalcite solid solution and described in Japanese Laid-Open Patent Publication No. 1-308439 (U.S. Pat. No. 4,954,557), can be used.

A metal salt of a higher aliphatic carboxylic acid refers to a metal salt of a higher fatty acid having 8 to 22 carbon atoms. Examples of higher fatty acids having 8 to 22 carbon atoms include lauric acid, stearic acid, and myristic acid. Examples of the metal include sodium, potassium, magnesium, calcium, zinc, barium and aluminum. Among these, alkaline-earth metals such as magnesium, calcium and barium are preferred.

The content of the metal salt of the higher aliphatic carboxylic acid or the hydrotalcite compound is preferably 0.01 to 3 parts by weight, more preferably 0.05 to 2.5 parts by weight with respect to the total weight of the resin composition.

In the fuel container of the present invention, the molded component comprising the above-described barrier resin (A) and the above-described thermoplastic resin (B) in the form of a mixture or a laminate is mounted on the fuel container body.

Hereinafter, first, a single layered molded component to be mounted on a fuel container will be described, and then a multilayered molded component will be described.

Single Layered Molded Component

In a single layered molded component, it is preferable to use polyethylene having a density of 0.93 g/cm³ or more, a carboxylic acid-modified polyolefin, and a boronic acid-modified polyolefin as the thermoplastic resin (B).

When polyethylene having a density of 0.93 g/cm³ or more is used as the thermoplastic resin (B), the molded component for a fuel container having such a feature has a lower impact resistance than that of a conventional molded component. However, it has significantly improved gasoline barrier properties, compared with a conventional molded component formed only of high density polyethylene. The density of polyethylene is preferably 0.93 g/cm³ or more. When the density is less than 0.93 g/cm³, the mechanical strength such as the impact resistance of the obtained molded component for a fuel container may be insufficient.

When a carboxylic acid-modified polyolefin is used as the thermoplastic resin (B), the gasoline barrier properties are improved, more than in a conventional molded component. This is also more preferable, compared with a system in which polyethylene having a density of 0.93 g/cm³ or more and the barrier resin (A) are blended, because the impact resistance of the obtained molded component for a fuel container is better.

When a boronic acid-modified polyolefin is used as the thermoplastic resin (B), the compatibility with the barrier resin (A) is high, and especially when EVOH is used as the barrier resin (A), the EVOH exhibits excellent dispersibility. Therefore, the mechanical strength, such as the impact resistance, is excellent, and high gasoline barrier properties and organic solvent resistance can be provided to the molded component for a fuel container. Therefore, this composition is particularly preferable.

The molded component mounted on a fuel container is molded from a resin composition preferably comprising 5 to 70 wt % of the barrier resin (A) and 30 to 95 wt % of the thermoplastic resin (B), more preferably 10 to 60 wt % of the barrier resin (A) and 40 to 90 wt % of the thermoplastic resin (B), and most preferably 20 to 50 wt % of the barrier resin (A) and 50 to 80 wt % of the thermoplastic resin (B).

Such a molded component provides a fuel container having excellent gasoline barrier properties, mechanical strength, and thermal fusion properties between the molded component and the fuel container body.

When the content of the barrier resin (A) is less than 5 wt % and the content of the thermoplastic resin (B) is more than 95%, the gasoline barrier properties of the molded component may be improved insufficiently. When the content of the barrier resin (A) is more than 70 wt % and the content of the thermoplastic resin (B) is less than 30 wt %, the impact resistance, the fatigue resistance and the thermal fusion properties of the molded component may be unsatisfactory.

In the molded component used in the present invention, if a resin composition is used, in which the barrier resin (A) is in a continuous phase and the thermoplastic resin (B) is in a dispersed phase, then the thermal fusion properties to the fuel container body, the impact resistance and the fatigue resistance may be improved insufficiently. For the molded component for a fuel container of the present invention, it is preferable to use a resin composition wherein both the barrier resin (A) and the thermoplastic resin (B) are in a continuous phase, or a resin composition wherein the barrier resin (A) is in a dispersed phase and the thermoplastic resin (B) is in a continuous phase. In particular, it is most preferable to use a resin composition wherein the barrier resin (A) is in a dispersed phase and the thermoplastic resin (B) is in a continuous phase, because this makes the molded component excellent with regard to both the barrier properties and the mechanical strength.

When the molded component is formed of a blended resin composition comprising the barrier resin (A) and the thermoplastic resin (B), it is preferable that the thermoplastic resin (B) comprises a compatibilizer (C) and a thermoplastic resin (D) having a solubility parameter (calculated from the Fedors' equation) of 11 or less other than the compatibilizer (C), and that the mixing ratio of components, (A), (C) and (D) is 5 to 70 wt % for (A), 1 to 85 wt % for (C), and 10 to 94 wt % for (D). Such a feature improves the compatibility between the barrier resin (A) layer and the thermoplastic resin (D) and can provide the resulting resin composition with stable morphology.

When the content of the barrier resin (A) is less than 5 wt %, the gasoline barrier properties of the molded component may be improved insufficiently. When the content of the barrier resin (A) is more than 70 wt %, the impact resistance, the fatigue resistance and the thermal fusion properties of the molded component may be insufficient.

When the content of the compatibilizer (C) is less than 1 wt %, the compatibility between the barrier resin (A) and the thermoplastic resin (D) may be insufficient. When the content of the compatibilizer (C) is more than 85 wt %, the ratios of the barrier resin (A) and the thermoplastic resin (D) to the total amount of the resin composition become low. Therefore, the performance, such as the barrier properties provided by the barrier resin and the melt-moldability, the mechanical strength and the thermal fusion properties provided by the thermoplastic resin (D), may be deteriorated.

When the content of the thermoplastic resin (D) is less than 10 wt %, the melt-moldability, the mechanical strength, the thermal fusion properties or the like may improve unsatisfactorily. Polyolefin is preferable as the thermoplastic resin (D). A content of polyolefin of less than 10 wt % may result in insufficient mechanical characteristics and thermal fusion properties, although polyolefin has these properties. In addition, the economical advantage may not be achieved. When the content of the thermoplastic resin (D) is more than 94 wt %, the gasoline barrier properties of the molded component may be improved insufficiently.

In the molded component for a fuel container of the present invention, if a resin composition wherein the barrier resin (A) is in a continuous phase and the compatibilizer (C) and the thermoplastic resin (D) are in a dispersed phase is used, then the thermal fusion properties to the fuel container body, the impact resistance and the fatigue resistance may be improved insufficiently. For the molded component for a fuel container of the present invention, it is preferable to use a resin composition wherein the barrier resin (A), the compatibilizer (C) and the thermoplastic resin (D) is in a continuous phase, or a resin composition wherein the barrier resin (A) is in a dispersed phase and the compatibilizer (C) and/or the thermoplastic resin (D) is in a continuous phase. In particular, it is most preferable to use a resin composition wherein the barrier resin (A) is in a dispersed phase and the compatibilizer (C) and/or the thermoplastic resin (D) is in a continuous phase, because this makes the molded component excellent in both the barrier properties and the mechanical strength.

When EVOH is used as the barrier resin (A), and the polyamide resin (C4) and the carboxylic acid-modified polyolefin (preferably, a metal salt thereof) (C2) are used as the compatibilizer (C), then the blending ratio by weight of the barrier resin (A), the compatibilizer (C) and the thermoplastic resin (D) are determined so as to satisfy equations (1) to (4) below.

$$0.6 \leq W(A+D)/W(T) \leq 0.995 \tag{1}$$

$$0.005 \leq W(C4+C2)/W(T) \leq 0.4 \tag{2}$$

$$0.5 \leq W(D)/W(A+D) \leq 0.99 \tag{3}$$

$$0.02 \leq W(C4)/W(C4+C2) \leq 0.98 \tag{4}$$

wherein W(A+D) is the total weight of (A) and (D) in the composition; W(C4) is the weight of polyamide (C4) in the composition; W(C4+C2) is the total weight of polyamide (C4) and carboxylic acid- modified polyolefin (C2) in the composition; W(D) is the weight of (D) in the composition; and W(T) is the total weight of the composition.

Preferably, $$0.65 \leq W(A+D)/W(T) \leq 0.99 \tag{1'}$$

$$0.01 \leq W(C4+C2)/W(T) \leq 0.35 \tag{2'}$$

$$0.55 \leq W(D)/W(A+D) \leq 0.98 \tag{3'}$$

$$0.04 \leq W(C4)/W(C4+C2) \leq 0.96 \tag{4'}$$

and more preferably, $$0.70 \leq W(A+D)/W(T) \leq 0.985 \tag{1''}$$

$$0.015 \leq W(C4+C2)/W(T) \leq 0.30 \tag{2''}$$

$$0.6 \leq W(D)/W(A+D) \leq 0.97 \tag{3''}$$

$$0.05 \leq W(C4)/W(C4+C2) \leq 0.95 \tag{4''}$$

When W(A+D)/W(T) exceeds 0.995, or W(C4+C2)/W(T) is less than 0.005, then the compatibility between EVOH (A) and the thermoplastic resin (D) is deteriorated, so that the effects of the present invention cannot be obtained. When W(A+D)/W(T) is less than 0.6, or W(C4+C2)/W(T) is more than 0.4, then the ratios of the barrier resin (A) and the thermoplastic resin (D) of the total weight of the composition become low. Therefore, the performance such as the barrier properties, which are a feature of the barrier resin, and the melt-moldability, which is a feature of the thermoplastic resin (D), may be deteriorated.

When W(C4)/W(C4+C2) is less than 0.02, the compatibility between EVOH (A) and polyamide resin (C4) is deteriorated. When W(C4)/W(C4+C2) is more than 0.98, the compatibility between carboxylic acid-modified polyolefin (C2) and the thermoplastic resin (D) is deteriorated. The deterioration of the compatibilizer between the components leads to deterioration of the mechanical strength or the barrier properties of the resin composition itself.

Furthermore, it is preferable that the blending ratio by weight of W(C4)/W(C4+C2) of polyamide resin (C4) and carboxylic acid-modified polyolefin (C2) is not more than 0.5 in view of thermal stability, more preferably not more than 0.45, and most preferably not more than 0.4. A blending ratio by weight of W(C4)/W(C4+C2) in these ranges improves the melt stability of the resin composition, and a molded article with a good appearance can be obtained by melt-molding for a long time. Thus, the productivity is improved. The reason thereof is not clear, but it is believed that the reaction between EVOH and polyamide resin adversely affects the melt-stability.

For the molded component for a fuel container used in the present invention, it is preferable to use a resin composition wherein the thermoplastic resin (D) is in a continuous phase and the EVOH (A) is in a dispersed phase. When such a resin composition is used for molding, a molded component for a fuel container with improved gasoline barrier properties is obtained. Increasing the value of W(D)/W(A+D) or increasing the ratio of the melt viscosity of (A)/(D) can provide such a dispersion form. The value of W(D)/W(A+D) is preferably 0.5 or more and 0.99 or less, more preferably 0.55 or more and 0.98 or less, and most preferably 0.6 or more and 0.97 or less. When the value of W(D)/W(A+D) is less than 0.5, it is difficult for the thermoplastic resin (D) to form a continuous phase, so that the impact resistance may be insufficient. When the value of W(D)/W(A+D) is more than 0.99, the gasoline barrier properties may be insufficient.

Method for Producing a Single Layered Molded Component

The molded component used in the present invention can be obtained easily by melting and mixing the components with a regular melt-kneading apparatus. The method for blending the components is not limited to a particular method. For example, the following method can be used. The barrier resin (A) and the thermoplastic resin (B), or the barrier resin (A), the compatibilizer (C) and the thermoplastic resin (D) are combined as appropriate. The blend is melted and kneaded by a single or twin screw extruder or the like, formed into pellets and dried. Alternatively, it is possible to introduce pellets of the barrier resin (A) and pellets of thermoplastic resin (B) to a molding machine for kneading in the molding machine. In the melting and mixing operation, the blend may be non-uniform, and gels or fisheyes that are generated are mixed in. Therefore, blending and pelletizing are performed preferably by an extruder having a high kneading degree, and it is preferable to seal the hopper port with nitrogen gas and to extrude the blend at a low temperature.

As the method for producing the molded component used in the present invention, for example, a suitable molding method in the field of regular polyolefins can be used, but it is not limited to a particular method. However, it is most preferable to mold a part or the whole of the molded component for a fuel container by injection molding, because molded components for a fuel container such as connectors, caps and valves generally have a complex shape.

Multilayered Molded Component

A multilayered molded component used in the present invention includes the barrier resin (A) layer and the thermoplastic resin (B) layer. A multilayered structure of the barrier resin (A) layer and the thermoplastic resin (B) can provide both the properties derived from the thermoplastic resin (B), such as the thermal fusion properties and the mechanical strength, e.g., impact resistance, and the properties derived from the barrier resin (A) layer, such as the gasoline barrier properties and the organic solvent resistance.

As described above, when the molded component is obtained by laminating the barrier resin (A) and the thermoplastic resin (B), the adhesion between the layers can be improved by incorporating the compatibilizer (C) into the barrier resin (A) layer or using a resin composition comprising the compatibilizer (C) and the thermoplastic resin (D) having a solubility parameter (calculated from the Fedors' equation) of 11 or less other than the compatibilizer (C) as the thermoplastic resin (B).

Barrier Resin (A) Layer

As the barrier resin (A) layer, a polyvinyl alcohol resin (A1) layer, a polyamide resin (A2) layer, or an aliphatic polyketone (A3) layer can be used. A polyvinyl alcohol resin (A1) layer is preferable. In particular, EVOH is preferable, and an EVOH layer having an ethylene content of 5 to 60 mol % and a degree of saponification of 85% or more is most preferable.

A barrier resin composition comprising the barrier resin (A), the compatibilizer (C) and the thermoplastic resin (D) can be used as the barrier resin (A) layer to avoid delamination from the thermoplastic resin (B) layer.

As the compatibilizer (C) used in the barrier resin composition, at least one resin selected from the group consisting of a saponified ethylene-vinyl acetate copolymer having an ethylene content of 70 to 99 mol % and a degree of saponification of 40% or more, a carboxylic acid-modified polyolefin, and a boronic acid-modified polyolefin are preferable.

The thermoplastic resin (D) is not an essential component, but it is preferable to use the thermoplastic resin (D), because the mechanical strength of the barrier resin (A) layer and the adhesion to the thermoplastic resin (B) layer can be improved further by incorporating the thermoplastic resin (D). In addition, it is possible to achieve cost merits by selecting a suitable resin.

The barrier resin composition comprises preferably 10 to 80 wt % of the barrier resin (A), 1 to 90 wt % of the compatibilizer (C) and 0 to 89 wt % of the thermoplastic resin (D) to improve the gasoline barrier properties and the interlayer adhesion.

The content of the barrier resin (A) (most preferably, EVOH) is preferably 10 to 80 wt %. The lower limit of the content is preferably 20 wt % or more, more preferably 30 wt % or more. The upper limit of the content of the barrier resin (A) is preferably 70 wt % or less, more preferably 60 wt % or less. When the content of the barrier resin (A) is less than 10 wt %, sufficient gasoline barrier properties cannot be obtained. When the content is more than 80 wt %, the adhesion to the thermoplastic resin (B) may be improved insufficiently.

The content of the compatibilizer (C) is preferably 1 to 90 wt %. The lower limit of the content is preferably 3 wt % or more, more preferably 5 wt % or more. The upper limit of the content of the compatibilizer (C) is preferably 80 wt % or less, more preferably 70 wt % or less. When the content of the compatibilizer (C) is less than 1 wt %, the adhesion to the thermoplastic resin (B) may be improved insufficiently. When the content is more than 90 wt %, sufficient gasoline barrier properties cannot be obtained.

The lower limit of the content of the thermoplastic resin (D) is preferably 1 wt % or more, more preferably 5 wt % or more. The upper limit of the content of the thermoplastic resin (D) is preferably 80 wt % or less, more preferably 70 wt % or less. When the content of the thermoplastic resin (D) is more than 89 wt %, the gasoline barrier properties are insufficient.

Thermoplastic Resin (B)

Examples of the thermoplastic resin (B) having a solubility parameter of 11 or less used in the multilayered molded component used in the present invention include polyolefin resins, styrene resins, and polyvinyl chloride resins. Since generally a polyolefin resin is used for the outermost layer of the fuel container body, the thermal fusion properties between the fuel container body and the molded component for the fuel container are insufficient when the solubility parameter of the thermoplastic resin (B) exceeds 11.

Examples of the polyolefin resin include homopolymers of α-olefins such as high density or low density polyethylene, polypropylene, and polybutene-1, and copolymers of α-olefins selected from the group consisting of ethylene, propylene, butene-1, and hexene-1. Examples thereof also include α-olefins copolymerized with diolefin, vinyl compounds such as vinyl chloride and vinyl acetate, and unsaturated carboxylic acid esters such as acrylic acid ester and methacrylic acid ester. Furthermore, boronic acid-modified polyolefins are also preferable. Examples of styrene resins include polystyrene, acrylonitrile-butadiene-styrene copolymer resin (ABS), acrylonitrile-styrene copolymer resin (AS), block copolymers with styrene-isobutylene, copolymers with styrene-butadiene or block copolymers with styrene-isoprene. Among these, polyolefin resin is most preferable in view of the thermal fusion properties and the mechanical strength of the molded component and economical advantages. The above-listed resins can be used alone or in combination of two or more as the thermoplastic resin (B).

In particular, it is preferable to use at least one selected from the group consisting of polyethylene having a density of 0.93 g/cm$^3$ or more, a saponified ethylene-vinyl acetate copolymer having an ethylene content of 70 to 99 mol % and a degree of saponification of 40% or more, a carboxylic acid-modified polyolefin, and a boronic acid-modified polyolefin.

When polyethylene having a density of 0.93 g/cm$^3$ or more is used as the thermoplastic resin (B), the multilayered molded component for a fuel container of the present invention cannot be provided with a high mechanical strength because the interlayer adhesion to the EVOH (A) layer is not high. However, the outermost layer of the fuel container body made of a thermoplastic resin is usually made of high density polyethylene, so that such a feature improves especially the thermal fusion properties. The density of polyethylene is preferably 0.93 g/cm$^3$ or more. When the density is less than 0.93 g/cm$^3$, the mechanical strength of the multilayered molded component for a fuel container may be insufficient.

When a carboxylic acid-modified polyolefin or boronic acid-modified polyolefin is used as the thermoplastic resin (B), the thermal fusion properties between the multilayered molded component for a fuel container and the fuel container body are deteriorated to some extent, compared to polyethylene of a density of 0.93 g/cm$^3$ or more. On the other hand, they are preferable in that a multilayered molded component with an excellent mechanical strength can be obtained, because high adhesion with the barrier resin (A) layer can be achieved.

A resin composition layer comprising the compatibilizer (C) and the thermoplastic resin (D) can be used preferably as the thermoplastic resin (B) layer to improve the mechanical strength of the obtained molded component for a fuel container and improve the thermal fusion properties to the fuel container body. Such a resin composition can provide a performance that is intermediate between the performance provided by the thermoplastic resin (B) comprising the compatibilizer (C) alone and the thermoplastic resin (B) comprising the thermoplastic resin (D) alone. More specifically, the resin composition layer provides generally lower thermal fusion properties to the fuel container body than the thermoplastic resin (B) comprising the compatibilizer (C) alone, but can provide a better molded article than the thermoplastic resin (B) comprising the compatibilizer (C) alone. On the other hand, the resin composition layer provides generally lower adhesion with the barrier resin (A) layer than the thermoplastic resin (B) comprising the compatibilizer (C) alone, but can provide a better molded article than the thermoplastic resin (B) comprising the thermoplastic resin (D) alone. Thus, it is preferable to use the resin composition comprising the compatibilizer (C) and the thermoplastic resin (D) as the thermoplastic resin (B) because an excellent molded article having both the advantages of good thermal fusion properties to the fuel container body and good adhesion with barrier resin (A) can be obtained.

As the compatibilizer (C), it is preferable to use at least one resin selected from the group consisting of a saponified ethylene-vinyl acetate copolymer having an ethylene content of 70 to 99 mol % and a degree of saponification of 40% or more, a carboxylic acid-modified polyolefin, and a boronic acid-modified polyolefin. Among these, a carboxylic acid-modified polyolefin or boronic acid-modified polyolefin is preferable.

As the thermoplastic resin (D), polyethylene having a density of 0.93 g/cm$^3$ or more is most preferable, in view of the mechanical strength of the multilayered molded component for a fuel container and the thermal fusion properties to the fuel container body. A density of less than 0.93 g/cm$^3$ may improve the mechanical strength such as impact resistance insufficiently. When polyethylene having a density of 0.93 g/cm$^3$ or more is used as the thermoplastic resin (D), the molded component for a fuel container having such a feature has improved gasoline barrier properties compared to a conventional molded article, although the impact resistance is not better than the conventional article.

Preferably, the thermoplastic resin (B) is formed of a resin composition comprising 1 to 99 wt % of the compatibilizer (C) and 99 to 1 wt % of the thermoplastic resin (D). When the content of the compatibilizer (C) is less than 1 wt %, the adhesion between the EVOH (A) layer and the thermoplastic resin (B) layer may be improved insufficiently. The mechanical strength of the resulting multilayered molded component for a fuel container may be poor. When the content of the thermoplastic resin (D) is less than 1 wt %, the thermal fusion properties of the multilayered molded component for a fuel container may be improved insufficiently.

Addition of Inorganic Filler

An inorganic filler can be added either to the barrier resin (A) layer or the thermoplastic resin (B) layer or both. It is preferable to add an inorganic filler to the barrier resin (A) layer in that the gasoline barrier properties can be improved. Addition of an inorganic filler to the thermoplastic resin (B) layer leads to improvement in the mechanical strength and the organic solvent resistance, for which a reduction of swelling due to gasoline is typical.

Non-limiting preferable examples of the inorganic filler used in the present invention include mica, sericite, glass flake and talc. These inorganic fillers can be used alone or in the form of a mixture of a plurality of inorganic fillers.

The content of the inorganic filler in the present invention is preferably 1 to 50 wt %. The lower limit of the content is preferably 5 wt % or more, more preferably 10 wt % or more, and most preferably 15 wt % or more. Furthermore, the upper limit of the content is preferably 45 wt % or less, more preferably 40 wt % or less. When the content is less than 1 wt %, the mechanical strength and the gasoline barrier properties may be improved insufficiently. On the other hand, when it exceeds 50 wt %, flow abnormalities easily occur during molding, which may cause whiskers or weld lines, and therefore it may not be possible to obtain a molded article having good appearance.

Layer Structure of the Multilayered Molded Component

The layer structure of the multilayered molded component used in the present invention is not limited to a particular structure, but for example, (outer) A/B (inner), (outer) B/A/B (inner), (outer) B/A/B/A/B (inner), wherein A is the barrier resin (A) layer, and B is the thermoplastic resin (B) layer, are preferable. In particular, when the multilayered molded component is molded with a two-color-molding machine, an A/B structure is preferable because the of ease of molding, and an (outer) A/B (inner) structure is most preferable in view of the stress cracking resistance of the molded component. On the other hand, when the multilayered molded component is molded by co-injection molding, an (outer) B/A/B (inner) structure is preferable because of the ease of molding, ease of designing of a mold, and cost merits. Herein, (inner) refers to the inner layer side, namely, the layer on the side in direct contact with the fuel. Furthermore, the thermoplastic resin (B) layer may be formed of a plurality of layers, as long as the effects of the present invention are not inhibited. The plurality of layers can include an adhesive resin layer and a polyolefin resin layer, or can include a resin composition layer (e.g., recovered layer) comprising a blend of the thermoplastic resin (B) and the barrier rein (A), and a polyolefin resin layer.

The thickness of the barrier resin (A) layer is not limited to a particular thickness. However, preferably the thickness of the barrier resin (A) layer is 0.5 to 50% of the total thickness of all the layers, when the barrier resin (A) layer is formed substantially only of the barrier (A), in view of the thickness of each layer, the gasoline barrier properties and the mechanical strength. The thickness of the barrier resin (A) layer is preferably 1 to 40% of the total thickness of all the layers, and even more preferably 3 to 30%.

When the barrier resin (A) layer is a resin composition, the gasoline barrier properties of the multilayered molded component can be varied by varying the content of the (A) component in the blending ratio even when the ratio in the thickness of the barrier resin (A) layer and the thermoplastic resin (B) layer is unchanged. More specifically, when the blending ratio of the (A) component in the barrier resin (A) layer is large, the gasoline barrier properties can be maintained even if the thickness of the barrier resin (A) layer is small. However, when the blending ratio of the (A) component in the barrier resin (A) layer is small, the thickness of the barrier resin (A) layer has to be increased to maintain the gasoline barrier properties. Thus, a preferable thickness of the barrier resin (A) layer depends on the composition of the barrier resin (A) layer. However, in general, the thickness of the resin composition (A) layer is preferably 30 to 90% of the total thickness of all the layers, more preferably 35 to 85% of the total thickness of all the layers, and most preferably 40 to 80%.

Production of the Multilayered Molded Component

If the compatibilizer (C) and the thermoplastic resin (D) are mixed with the barrier resin (A) layer and the thermoplastic resin (B) layer used in the present invention, or if the barrier resin (A) layer and the thermoplastic resin (B) layer are resin compositions comprising an inorganic filler, a desired resin composition can be obtained easily by melting and mixing the components by a melt-kneading apparatus. The method for blending the components is not limited to a particular method. For example, the blend is melted and kneaded by a single or twin screw extruder or the like, formed into pellets and dried. In the melting and mixing operation, the blend may be non-uniform, and gels or fisheyes that are generated are mixed in. Therefore, blending and pelletizing are performed preferably by an extruder having a high kneading degree, and it is preferable to seal the hopper port with nitrogen gas and to extrude the blend at a low temperature.

As the method for producing the multilayered molded component used in the present invention, for example, a suitable molding method from the field of polyolefins can be used. However, it is most preferable to mold the multilayered molded component by multilayer injection molding, because molded components for a fuel container such as connectors, caps and valves generally have a complex shape. Non-limiting examples of the multilayer injection molding include two-color molding, insert injection molding, and co-injection molding, and a suitable method is selected in accordance with the shape of the desired molded article.

Two-color molding refers to molding wherein using, for example, a molding machine having two sets of injecting mechanism, the barrier resin (A) or the thermoplastic resin (B) that is melted is injected into a single mold and then the thermoplastic resin (B) or the barrier resin (A) is injected. Although in the two-color molding, conventionally a system wherein a mold can be reversed is used, a core back system can be selected when appropriate. Thus, the two-color molding is not limited thereto. The following is an example of the reverse-mold system. (1) First, after the thermoplastic resin (B) is injected, the mold is reversed, and then the barrier resin (A) is injected. Thus, a two layered structure of A/B can be obtained, wherein A is the barrier resin (A) layer, and B is the thermoplastic resin (B) layer; and (2) after the thermoplastic resin (B) is injected, the mold is reversed, and subsequently the barrier resin (A) is injected. Then, the die is reversed again, and the thermoplastic resin (B) is injected. Thus, a three layered structure of B/A/B can be obtained. However, there is no limitation to this method.

Insert injection molding refers to a molding wherein a molded article that has been molded in advance is mounted on a mold, and then injection molding is performed. For example, a molded article made of the barrier resin (A) or a molded article made of the thermoplastic resin (B) is obtained by injection molding in advance. Then, the molded article is mounted on an insert injection molding machine, and the thermoplastic resin (B) and/or the barrier resin (A) is injected. Thus, a molded article having a two layered structure of A/B or a molded article having a three layered structure of B/A/B can be obtained. However, there is no limitation to this method.

Co-injection molding refers to the following molding. Using a molding machine having, for example two injection cylinders, one clamping operation is performed to a single mold. The melted barrier resin (A) and the melted thermoplastic resin (B) are injected from respective injection cylinders to a concentric circular nozzle alternately at different times or to a concentric circular nozzle at the same time. For example, (1) first, the thermoplastic resin (B) layer is injected for the inner and outer layers, and then the barrier resin (A) is injected for the intermediate layer. Thus, a molded article having a three layered structure of B/A/B can be obtained. Alternatively, (2) first, the thermoplastic resin (B) layer is injected for the inner and outer layers, and then the barrier resin (A) is injected, and simultaneously or thereafter, the thermoplastic resin (B) is injected again. Thus, a molded article having a five layered structure of B/A/B/A/B can be obtained. However, there is no limitation to this method.

Molded Component and Fuel Container Body on which the Molded Component is Mounted The fuel container of the present invention is a container that can accommodate not only gasoline, but also so-called oxygen-containing gasoline such as alcohol-containing gasoline and MTBE-containing gasoline, and includes a fuel container body and a molded component that is mounted on the fuel container body.

The fuel container body is formed preferably of thermoplastic resin. In general, it is preferable that the fuel container is formed of a resin having a multilayered structure including a barrier resin layer as the intermediate layer, and a polyolefin layer as the outermost layer, in view of the mechanical strength of the fuel container. As the barrier resin layer, EVOH is preferable, and EVOH having an ethylene content of 5 to 60 mol % and a degree of saponification of 90% or more is more preferable. As polyolefin for the outermost layer, high density polyethylene is preferable.

The method for mounting the molded component on the fuel container body is not limited to a particular method. For example, mounting by screwing or inserting, or mounting by thermal fusion can be used. In particular, thermal fusion is preferable in view of reduction of the number of processes for attachment and suppression of fuel leakage from the mounting portion.

The molded component used in the present invention refers to a molded component that is mounted on the fuel container body. Non-limiting specific examples thereof include a connector for a fuel container, a cap for a fuel container, and a valve for a fuel container. A connector for a fuel container and a valve for a fuel container are preferable.

The molded component can be used as a molded component connector in the form of a connector for a fuel container mounted on a fuel container body or further in the form of a connector to which a flexible pipe for fuel transport is mounted. However, the form is not limited thereto. Examples of the method for mounting the connector on the fuel container body include mounting by screwing or inserting, and mounting by thermal fusion. In particular, thermal fusion is preferable in view of reduction of the number of processes for attachment and suppression of fuel leakage from the connection portion. Therefore, it is particularly preferable that the connector has excellent thermal fusion properties to the fuel container body. In order to suppress fuel leakage from the portion where the connector is mounted on the fuel container body, it is particularly preferable that the connector has excellent gasoline barrier properties. Furthermore, it is preferable that the connector has excellent stress cracking resistance, and organic solvent resistance in view of continuous use for a long time of the molded component for a fuel container, namely, the lifetime of the product.

In a preferable embodiment as the connector for a fuel container, a flexible pipe for fuel transport is further connected to the connector for a fuel container connected to the fuel container body. Therefore, a continuous load to the connector is generated due to vibration of the fuel container itself or vibration of the transport pipe when the automobile is running, when supplying fuel from the fuel container to the engine, or when introducing the fuel from a fuel supply port to the fuel container. From these viewpoints, it is desirable that the connector for a fuel container has excellent impact resistance, stress cracking resistance and organic solvent resistance.

A cap for a fuel container is used as a closing lid for a fuel filler port. The cap can be connected by any method. For example screwing or inserting are possible, but screwing is preferable. At present, the cap for a container fuel is commonly made of a metal. However, in recent years, caps made of a thermoplastic resin have been used increasingly, because of their low weight and for recycle purposes. A fuel filler port, which is connected to the fuel container body through a fuel tube and the connector for a fuel container, conventionally causes the problem of contamination with a metal oxide to the fuel container due to rust occurring from the cap for a fuel container made of metal. From this viewpoint, caps made of a thermoplastic resin are significant. Such a cap for a fuel container preferably has excellent gasoline barrier properties, organic solvent resistance and stress cracking resistance, and more preferably has excellent mechanical strength such as abrasion resistance, because of repetitive opening and closing.

Furthermore, a fuel container wherein a component made of a thermosetting resin (E) is mounted on a fuel container body provided with a single or multilayered molded component via the molded component is also preferable as an embodiment of the present invention The fuel container having this structure is preferable, because the component made of the thermosetting resin (E) has mechanical strength and excellent gasoline barrier properties, and the molded component made of the resin composition of the present invention is present between the component made of the thermosetting resin (E) and the fuel container body so that high gasoline barrier properties can be provided. As the thermosetting resin (E), it is particularly preferable to use polymethylene oxide resin in view of the mechanical strength and gasoline barrier properties. The molded component for a fuel container mounted on the fuel container with these features is preferably used as a pressure relief valve for a fuel container, although not limited thereto.

The method for mounting the component made of the thermosetting resin (E) on a fuel container via a single layered or multilayered molded component is not limited to a particular method. For example, first, a molded component is mounted on a fuel container body, and then a component for a fuel container made of the thermosetting resin (E) is mounted on the molded component by screwing or inserting. Alternatively, first, a single layered or multilayered molded component is mounted on a component for a fuel container made of the thermosetting resin (E), and then this is mounted on a fuel container body. However, the method is not limited to thereto.

The method for mounting a single layered or multilayered molded component on a fuel container body is not limited to a particular method. For example, mounting by screwing or inserting, or mounting by thermal fusion can be used. In particular, thermal fusion is preferable in view of reduction of the number of processes for attachment and suppression of fuel leakage from the mounting portion.

The method for mounting a molded component on the component made of the thermosetting resin (E) is not limited to a particular method. Screwing or inserting is preferable. A method of coating the junction portion between the component made of the thermosetting resin (E) and the fuel container with the resin composition used in the present invention is also preferable. The adhesion between the thermosetting resin (E) and the resin composition used in the present invention is generally small. Therefore, it is preferable to coat the surface of the component made of the thermosetting resin (E) with the resin composition used in the present invention as much as possible, as long as it does not interfere with the function of the molded component. Such a feature allows suppression of detachment at the interface between the molded component body made of the thermosetting resin (E) and the resin composition of the present invention.

Furthermore, a method for coating the molded component body with the resin composition used in the present invention is not limited to a particular method. For example, preferable methods are as follows. The component made of the thermosetting resin (E) that is prepared earlier by injection molding or the like is placed in a mold, and the resin composition of the present invention is injected thereto with an injection molding machine for coating (insert injection method). Alternatively, the thermosetting resin (E) and the resin composition used in the present invention are co-injected for molding. The insert injection method is particularly preferable.

EXAMPLES

Hereinafter, the present invention will be described by way of examples. However, the present invention is not limited thereto.

Materials

Table 1 shows the resin components used to produce the molded components of Examples 1 to 25 and Comparative Examples 1 to 19.

TABLE 1

Barrier resin (A)

- a-1 EVOH with ethylene content of 44 mol %, degree of saponification of 99.5%
  Gasoline barrier properties: 0.004 g 20 μm/m$^2$ · day
  MFR 1.3 g/10 min.(190° C.–2160 g load)
- a-2 EVOH with ethylene content of 32 mol %, degree of saponification of 99.5%
  Gasoline barrier properties: 0.003 g 20 μm/m$^2$ · day
  MFR 1.6 g/10 min.(190° C.–2160 g load)
- a-3 EVOH with ethylene content of 44 mol %, degree of saponification of 99.5%
  MFR 6 g/10 min.(190° C.–2160 g load)

Thermoplastic resin (B)

- b-1 High density polyethylene manufactured by Mitsui Chemicals, Inc. HZ3300F
  Density of 0.954 g/cm$^2$
- b-2 Ethylene-methacrylic acid random copolymer (EMAA)
  3.1 mol % methacrylic acid copolymer MFR 1.5 g/10 min.(190° C.–2160 g load)
- b-3 Boronic acid-modified polyethylene (prepared according to Synthesis Example 1)
- b-4 Polyethylene with a density of 0.952 g/cm$^2$
  MFR 0.3 g/10 min.(190° C.–2160 g load)
- b-5 Maleic acid-modified polyethylene (Mitsubishi Chemical Modic H541)
- b-6 Boronic acid-modified polyethylene (prepared according to Synthesis Example 3)

Compatibilizer (C)

- c-1 Saponified ethylene-vinyl acetate copolymer having ethylene content of 89 mol %, degree of saponification of 97% MFR 5 g/10 min.(190° C.–2160 g load)
- c-2 Ethylene-methacrylic acid random copolymer (EMAA)
  methacrylic acid content of 3.1 mol % MFR 1.5 g/10 min.(190° C.–2160 g load)
- c-3 Boronic acid-modified very low density polyethylene (prepared according to Synthesis Example 2)
- c-4 Maleic acid-modified polyethylene (Mitsubishi Chemical Modic H541)
- c-5 Boronic acid-modified polyethylene (prepared according to Synthesis Example 3)
- c-6 Ethylene-methacrylic acid random copolymer (4.3 mol % methacrylic acid copolymer) with a density of 0.94 g/cm$^3$ MFR 7 g/10 min.(190° C.–2160 g load) melting point of 98° C.
- c-7 Ethylene-methacrylic acid random copolymer metal salt (7.5 mol % methacrylic acid copolymer) with a density of 0.94 g/cm$^3$ neutralization metal: zinc, neutralization degree: 40%
  MFR 1.1 g/10 min.(190° C.–2160 g load), melting point of 94° C.

Thermoplastic resin (D)

- d-1 High density polyethylene manufactured by Mitsui Chemicals HZ3300F
  Density of 0.954 g/cm$^3$
  Gasoline barrier properties: 4000 g 20 μm/m$^2$ day
- d-2 Polyethylene with density of 0.952 g/cm$^3$
  MFR 0.3g/10 min.(190° C.–2160 g load)
- d-3 High density polyethylene MFR 2 g/10 min.(190° C.–2160 g load)
  Melting point of 128° C., Showa Denko HD-5050

Polyamide resin

- f-1 6/12-polyamide 6-PA/12-PA copolymer ratio 80/20 mol % Melting point of 200° C. Ube Nylon 7024B Synthesis of Resin used in the Present Invention

Synthesis Example 1

The boronic acid-modified polyethylene (b-3) (polyethylene having a boronic acid ethylene glycol ester group at its terminal) shown in Table 1 was prepared in the following manner.

A thousand grams of polyethylene {MFR of 0.3 g/10 min (at 210° C.–2160 g load), density of 0.90 g/cm$^3$, amount of terminal double bond of 0.048 meq/g} and 2500 g of decalin were fed to a separable flask with a cooler, a stirrer and a dropping funnel, and deaeration was performed by reducing the pressure at room temperature. Thereafter, purging with nitrogen was performed. Then, 78 g of trimethyl borate, and 5.8 g of a boron-triethyl amine complex were added and reacted for 4 hours at 200° C. Then, a distillery was attached, and 100 ml of methanol was added dropwise at slow speed. After the methanol addition was completed, impurities having a low boiling point such as methanol, trimethyl borate and triethylamine were distilled off under reduced pressure. Further, 31 g of ethylene glycol was added, and 10 minutes of stirring were performed, followed by reprecipitation with acetone and drying. Thus, the boronic acid-modified polyethylene (b-3) having an boronic acid ethylene glycol ester group of 0.027 meq/g and a MFR of 0.2 g/10 min was obtained.

Synthesis Example 2

The boronic acid-modified very low density polyethylene (c-3) (very low density polyethylene having a boronic acid ethylene glycol ester group at its terminal) shown in Table 1 was prepared in the following manner.

A thousand grams of very low density polyethylene {MFR of 7 g/10 min (at 210° C.–2160 g load), density of 0.89 g/cm$^3$, amount of terminal double bond of 0.048 meq/g} and 2500 g of decalin were fed to a separable flask with a cooler, a stirrer and a dropping funnel, and deaeration was performed by reducing the pressure at room temperature. Thereafter, purging with nitrogen was performed. Then, 78 g of trimethyl borate, and 5.8 g of a boron-triethyl amine complex were added and reacted for 4 hours at 200° C. Then, a distillery was attached, and 100 ml of methanol was added dropwise at slow speed. After the methanol addition was completed, impurities having a low boiling point such as methanol, trimethyl borate, and triethylamine were distilled off under reduced pressure. Further, 31 g of ethylene glycol was added, and 10 minutes of stirring were performed, followed by reprecipitation with acetone and drying. Thus, the boronic acid-modified very low density polyethylene (c-3) having an boronic acid ethylene glycol ester group amount of 0.027 meq/g and a MFR of 5 g/10 min (at 210° C.-load 2160 g) was obtained.

Synthesis Example 3

The boronic acid-modified polyethylene (b-6) (and (c-5)) (high density polyethylene having a boronic acid ethylene glycol ester group at its terminal) shown in Table 1 was prepared in the following manner.

A thousand grams of high density polyethylene {MFR of 0.3 g/10 min (at 190° C.–2160 g load), density of 0.952 g/cm$^3$, amount of terminal double bond of 0.048 meq/g} and 2500 g of decalin were fed to a separable flask with a cooler, a stirrer and a dropping funnel, and deaeration was performed by reducing the pressure at room temperature. Thereafter, purging with nitrogen was performed. Then, 78 g of trimethyl borate, and 5.8 g of a boron-triethyl amine complex were added and reacted for 4 hours at 200° C. Then, a distillery was attached, and 100 ml of methanol was added dropwise at slow speed. After the methanol addition was completed, impurities having a low boiling point such as methanol, trimethyl borate, and triethylamine were distillated off under reduced pressure. Further, 31 g of ethylene glycol was added, and 10 minutes of stirring were performed, followed by reprecipitation with acetone and drying. Thus, the boronic acid-modified high density polyethylene (b-6) (and (c-5)) having an boronic acid ethylene glycol ester group amount of 0.027 meq/g and a MFR of 0.3 g/10 min (at 190° C.-load 2160 g) was obtained.

Measurement of the Fuel Permeation Amount of the Resin

The fuel permeation amount of the barrier resin (A) was measured by the following processes (1) to (5).

(1) BA-055 manufactured by Paxon (density of 0.970 g/cm$^3$, MFR=0.03 g/10 min at 190° C.–2160 g load) was used as high density polyethylene (HDPE), and ADMER GT-6A MFR 0.94 g/10 min (at 190° C.–2160 g load) manufactured by Mitsui Chemicals, Inc. was used as an adhesive resin (Tie). The high density polyethylene, the barrier resin (A) and the adhesive resin were fed to separated extruders, and a co-extruded sheet having a structure of high density polyethylene/adhesive resin/barrier resin (A)/ adhesive resin/high density polyethylene (50 µm/5 µm/10 µm/5 µm/50 µm thickness) with a total thickness of all the layers of 120 µm was obtained with a molding apparatus. The extrusion molding was performed in the following manner. For the high density polyethylene, an extruder with a single screw with a diameter of 65 mm and L/D=24 was used at a temperature of 170 to 210° C. For the adhesive resin, an extruder with a single screw with a diameter of 40 mm and L/D=22 was used at a temperature of 160 to 210° C. For the barrier resin (A), an extruder with a single screw with a diameter of 40 mm and L/D=22 was used at a temperature of 170 to 210° C. A feed block type die (600 mm width) was operated at 210° C. Thus, the co-extruded sheet (a1) was obtained.

(2) One surface of the co-extruded sheet (a1) was coated with an aluminum tape (product name: Alumiseal manufactured by FP Kakou, gasoline barrier properties=0 g·20 µm/m$^2$·day).

(3) The co-extruded sheet (a1) and the co-extruded sheet (b1) coated with the aluminum tape was cut to a size of 210 mm×300 mm.

(4) Each cut sheet was folded in the center, and two sides were heat-sealed with Heat sealer T-230 manufactured by Fuji Impulse while adjusting the seal width to 10 mm with dial 6. Thus, a pouch was produced.

(5) Then, 200 ml of Ref. C (toluene/iso-octane=1/1) as a model gasoline were filled in each pouch from the side that was not sealed, and the side from which the gasoline was introduced was heat-sealed while adjusting the seal width to 10 mm in the same manner as above.

The pouch filled with fuel was stored in an explosion-proof air-conditioned chamber (40° C.–65% RH), and the weight of the pouch was measured every 7 days over 3 months. Such a test was performed with respect to 5 co-extruded pouches without aluminum foil (a2) and 5 co-extruded pouches coated with an aluminum tape (b2). The change in the weight of each pouch was read before the storage and at each predetermined time later, and the amount of the fuel permeation was calculated based on the period during which they were stored and the gradient of the change amount in the weight of the pouch.

The amount of the fuel permeation of the co-extruded pouches without aluminum foil (a2) is the sum of the amounts the fuel permeation from the surface of the pouch and the heat sealed portions. The amount of the fuel permeation of the co-extruded pouches coated with an aluminum tape (b2) is the amount of the fuel permeation from the heat sealed portions.

The amount of the fuel permeation of the barrier resin (A) is {permeation amount from (a2)}–{permeation amount from (b2)}, and the amount of the fuel permeation (g·20 µm/m$^2$·day) of the barrier resin (A) was calculated, based on the permeation amount per 20 µm of the barrier resin (A) layer and the thickness.

A. Production Example 1 of a Single Layered Molded Component

Examples 1 to 4 and Comparative Examples 1 to 4

Example 1

A blend comprising 40 parts by weight of EVOH (a-1) having an ethylene content of 44 mol % and a MFR of 1.3 g/10 min (at 190° C.–2160 g load) and 60 parts by weight of polyethylene (b-1) having a MFR of 1.1 g/10 min (at 190° C.–2160 g load) and a density of 0.954 g/cm$^3$ was obtained in the following manner. The EVOH (a-1) and the polyethylene (b-1) having a density of 0.954 g/cm$^3$ were fed into a twin screw type vent extruder, and extruded at 220° C. in the presence of nitrogen and pelletized so that pellets of a resin composition were obtained.

Figure 2:
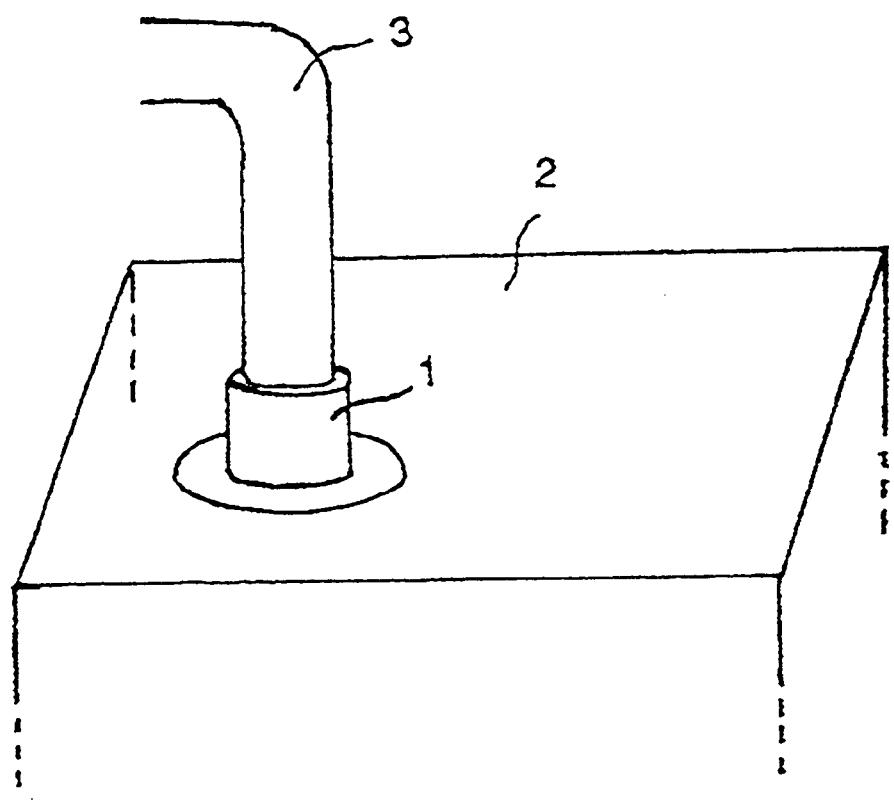
FIG. 2 is a view showing the manner in which the connector-like molded article is used.

The obtained pellets were fed to an injection molding machine to produce a cylindrical single layered injection-molded article having a shape as shown in FIG. 1 with an inner diameter of 63 mm, an outer diameter of 70 mm and a height of 40 mm. This molded article has a shape similar to that of a connector for a fuel container (hereinafter, referred to as a connector-like molded article). As shown in FIG. 2, the connector-like molded article 1 is attached to a container body 2, and a pipe 3 is attached to the port of the connector-like molded article 1. On the other hand, an EVOH based multilayered fuel container having a volume of 35 liters and a surface area of 0.85m$^2$ was produced with a direct blow molding machine for five layers of three types of resin. In this production, high density polyethylene (HDPE: HZ8200B manufactured by Mitsui Chemicals, Inc.) as the inner and outer layers and further an adhesive resin (maleic anhydride-modified LDPE, ADMER GT5A manufactured by Mitsui Chemicals, Inc.) were used. The layer structure of this fuel container was (outer) HDPE/adhesive resin/EVOH (a-1)/adhesive resin/HDPE (inner)=2500/100/150/100/2500 (μm). Furthermore, in order to evaluate the performance such as mechanical strength, a flat plate with 10 cm (length)×10 cm (width)×5 mm (thickness) and injected pieces for various test were molded with the pellets.

Two holes with a diameter of 55 mm were opened for mounting the connector on the fuel container. Thereafter, these opening portions and the single layered injection-molded articles of FIG. 1 were melted for 40 seconds on an iron plate with 250° C., and pressed into each other for thermal fusion. Thus, a multilayered fuel container was obtained. Using the obtained multilayered fuel container to which the two single layered injection-molded articles were fused, the gasoline barrier properties and the adhesion strength were evaluated in the following manner. Furthermore, using the flat plate and the injected pieces for tests that were molded with the pellets, the impact resistance, the stress cracking resistance, and the organic solvent resistance were evaluated. Table 2 shows the results.

(1) Gasoline Barrier Properties 25 liters of a model gasoline (toluene/iso-octane=50/50 vol %) were filled in the thus obtained multilayered fuel container having openings to which two single layered injection-molded articles are fused. Then, an aluminum plate with a diameter of 80 mm and a thickness of 0.5 mm was adhered firmly to one side of the single layered injection-molded article with an epoxy based adhesive. Thereafter, the weight loss (n=5) in an explosion-proof air-conditioned chamber (40° C.–65% RH) was measured four weeks later, and the amount of the fuel permeation amount (g/pkg·4 weeks) from the obtained multilayered fuel container to which two single layered injection-molded articles were fused was calculated.

(2) Adhesion Strength

A hook type wire with a diameter of 2 mm was attached to the connector fused to the fuel container, and the fuel container was turned upside down so that the connector is present on the lower side and the wire was directed downward. A 20 kg weight was attached slowly to the tip of the wire. Then, it was observed whether or not the connected portion was damaged, and an evaluation was conducted with the following criteria.

| Evaluation | Criterion |
|---|---|
| ⊚ (acceptable) | No detachment in the connected portion |
| x (unacceptable) | Detachment in the connected portion |

(3) Impact resistance

Plate samples (n=5) obtained by injection molding of the resin composition were stored at 20° C.–65% RH for two weeks. Then, the strength against impact was measured according to JIS K7110 using an Izod impact tester.

(4) Stress Cracking Resistance

Test pieces (n=10) obtained by injection molding of the resin composition were stored at 20° C.–65% RH for two weeks. Then, the stress cracking characteristics (time) were measured according to JIS Z1703 in water.

(5) Organic Solvent Resistance

Circular plate samples (n=5) obtained by injection molding of the resin composition were stored at 20° C.–65% RH for two weeks. Then, the degree of swelling was measured according to JIS K7114 in a model gasoline (toluene/iso-octane=50/50 vol %), and the appearance was observed. The appearance was evaluated by the following criteria:

| Evaluation | Criterion |
|---|---|
| ⊚ (acceptable) | No color change, no swelling, good appearance |
| ○ (acceptable) | Slight color change and/or swelling, but usable. |
| x (unacceptable) | Cracks occur. Unusable. |

Examples 2 to 4 and Comparative Examples 1 to 4

Resin compositions comprising the barrier resin (A) (a-1) and (a-2), and the thermoplastic resin (B) (b-1), (b-2) and (b-3) shown in Table 1 in a blend ratio shown in Table 2 were produced. The connector-like molded article was produced in the same manner as in Example 1. Then, evaluation was conducted in the same manner as in Example 1. Table 2 shows the results.

TABLE 2

| | Barrier resin (A) | Thermoplastic resin (B) | Gasoline barrier properties 1) | Adhesion strength | Impact resistance 2) | Stress cracking 3) | Organic solvent resistance | |
|---|---|---|---|---|---|---|---|---|
| | | | | | | | Appearance | Swelling degree 4) |
| Ex. 1 | a-1 40% | b-1 60% | 0.08 | ⊚ | 3.7 | 16 | ○ | 5.5 |
| Ex. 2 | a-1 40% | b-2 60% | 0.10 | ⊚ | 5.2 | 26 | ⊚ | 4.1 |
| Ex. 3 | a-1 40% | b-3 60% | 0.12 | ⊚ | 6.0 | 30 | ⊚ | 2.4 |
| Ex. 4 | a-2 40% | b-3 60% | 0.10 | ⊚ | 5.6 | 25 | ○ | 3.0 |

TABLE 2-continued

| | Barrier resin (A) | Thermo-plastic resin (B) | Gasoline barrier properties 1) | Adhesion strength | Impact resis-tance 2) | Stress cracking 3) | Organic solvent resistance | |
|---|---|---|---|---|---|---|---|---|
| | | | | | | | Appear-ance | Swelling degree 4) |
| Com. Ex. 1 | a-1 100% | — | <0.05 | x | 4.2 | 17 | ◉ | 2.0 |
| Com. Ex. 2 | — | b-1 100% | 3.62 | ◉ | 6.0 | >30 | ○ | 8.5 |
| Com. Ex. 3 | a-1 4% | b-1 96% | 3.55 | ◉ | 5.1 | >30 | ○ | 8.3 |
| Com. Ex. 4 | a-1 80% | b-1 20% | 0.05 | x | 4.3 | 16 | ○ | 2.4 |

1) Unit: g/pkg · 4 weeks
2) Unit: Kgf · cm/cm$^2$
3) Unit: hours
4) Unit: % by weight The molded components for a fuel container of the present invention obtained in Examples 1 to 4 have excellent gasoline barrier properties and impact resistance, and sufficient thermal fusion properties, stress cracking resistance, and organic solvent resistance. In particular, it is most preferable to use carboxylic acid-modified polyolefin or boronic acid-modified polyolefin as the thermoplastic resin (B), because the molded components have excellent impact resistance and stress cracking resistance, and the gasoline barrier properties and the organic solvent resistance are significantly improved.

In Comparative Example 3, wherein the content of the barrier resin (A) is less than 5 wt %, and Comparative Example 2, which contains no barrier resin (A) but only thermoplastic resin (B) is contained, the gasoline barrier properties were significantly poorer. Furthermore, in Comparative Example 1, wherein only the barrier resin (A) is contained, and Comparative Example 4, wherein the content of the thermoplastic resin (B) is less than 30 wt %, the thermal fusion properties were unacceptable.

B. Production Example 2 of a Single Layered Molded Component

Examples 5 to 8 and Comparative Examples 5 to 9

In Examples 5 to 8, the compatibilizer (C) and the thermoplastic resin (D) were used as the thermoplastic resin (B) for production of a single layered molded component.

The amount of the fuel permeation of the barrier resin (A) was measured in the same manner as above.

The gasoline barrier properties of the thermoplastic resin (D) was measured in the following manner.

(1) The thermoplastic resin (D) was extruded with Laboplastmil manufactured by Toyo Seiki (20 mm diameter, L/D=22), using a coat-hanger die with a width of 300 mm at a temperature 20° C. higher than the melting point of the thermoplastic resin (C), so that a 100 μm sheet was produced. Then, the sheet was cut to a size of 210 mm×300 mm.

(2) The cut sheet was folded in the center, and two sides were heat-sealed with Heat sealer T-230 manufactured by Fuji Impulse while adjusting the seal width to 10 mm with dial 6. Thus, a pouch was produced.

(3) Then, 200 ml of Ref. C (toluene/iso-octane=1/1) as a model gasoline were filled in the pouch from the side that was not sealed, and the side from which the gasoline was introduced was heat-sealed while adjusting the seal width to 10 mm, in the same manner as above.

(4) The pouch filled with fuel was stored in an explosion-proof air-conditioned chamber (40° C.–65% RH), and the weight of the pouch was measured every 6 hours over 3 days. Such a test was performed with respect to 5 pouches. The change in the weight of the pouch was read before the storage and at each predetermined time later, and the amount of the fuel permeation from the pouch was calculated based on the period they were stored and the gradient of the change in the weight of the pouch. Then, based on the thickness, the amount of the fuel permeation (g·20 μm/m$^2$·day) of the thermoplastic resin (D) was calculated.

Example 5

A resin composition comprising 30 parts by weight of EVOH (a-1) having an ethylene content of 44 mol %, a degree of saponification of 99.5% and a MFR of 1.3 g/10 min (at 190° C.–2160 g load), 15 parts by weight of a saponified ethylene—vinyl acetate copolymer (c-1) having an ethylene content of 89 mol %, a degree of saponification of 97%, a MFR of 5 g/10 min (at 190° C.–2160 g load) and 55 parts by weight of polyethylene (d-1) having a MFR of 1.1 g/10 min (at 190° C.–2160 g load) and a density of 0.954 g/cm$^3$ was obtained in the following manner. The EVOH (a-1), the saponified ethylene—vinyl acetate copolymer (c-1) having an ethylene content of 89 mol % and a degree of saponification of 97%, and the polyethylene (d-1) having a density of 0.954 g/cm$^3$ were fed into a twin screw type vent extruder, and extruded at 220° C. in the presence of nitrogen and pelletized so that pellets of a resin composition were obtained.

The obtained resin pellets were molded into flat plates, injected pieces for various tests, and a fuel container (FIG. 2) provided with a connector-like cylindrical single layered injection-molded article having a shape shown in FIG. 1 in the same manner as in Example 1. The gasoline barrier properties, the adhesion strength, the impact resistance, the stress cracking resistance and the organic solvent resistance were evaluated. Table 3 shows the results.

Examples 6 to 8 and Comparative Examples 5 to 8

Resin compositions comprising the barrier resin (A) (a-1) and (a-2), the compatibilizer (C) (c-1), (c-2) and (c-3) and the thermoplastic resin (D) (d-1) shown in Table 1 in a blend ratio shown in Table 3 were produced. The connector-like molded article was produced in the same manner as in Example 4. Then, an evaluation was conducted in the same manner as in Example 4. Table 3 shows the results.

TABLE 3

| | Barrier resin (A) | Compatibilizer (C) | Thermoplastic resin (D) | Gasoline barrier properties 1) | Adhesion strength | Impact resistance 2) | Stress cracking 3) | Organic solvent resistance Appearance | Organic solvent resistance Swelling degree 4) |
|---|---|---|---|---|---|---|---|---|---|
| Ex. 5 | a-1 30% | c-1 15% | d-1 55% | 0.22 | ⊙ | 4.4 | 18 | ○ | 5.1 |
| Ex. 6 | a-1 30% | c-2 15% | d-1 55% | 0.26 | ⊙ | 5.1 | 28 | ⊙ | 3.9 |
| Ex. 7 | a-1 30% | c-3 15% | d-1 55% | 0.30 | ⊙ | 5.9 | >30 | ⊙ | 2.4 |
| Ex. 8 | a-2 30% | c-3 15% | d-1 55% | 0.26 | ⊙ | 5.3 | 30 | ○ | 2.9 |
| Com. Ex. 5 | a-1 100% | — | — | <0.05 | x | 4.2 | 17 | ⊙ | 2.0 |
| Com. Ex. 6 | — | — | d-1 | 3.62 | ⊙ | 6.0 | >30 | ○ | 8.5 |
| Com. Ex. 7 | a-1 75% | c-3 10% | d-1 15% | 0.07 | x | 4.6 | 15 | ○ | 2.7 |
| Com. Ex. 8 | a-1 3% | c-3 15% | d-1 82% | 3.44 | ⊙ | 5.5 | >30 | ○ | 8.1 |

1) Unit: g/pkg · 4 weeks
2) Unit: Kgf · cm/cm$^2$
3) Unit: hours
4) Unit: % by weight The molded components for a fuel container obtained in Examples 5 to 8 have excellent gasoline barrier properties and impact resistance, and sufficient thermal fusion properties, stress cracking resistance, and organic solvent resistance. In particular, it is most preferable to use carboxylic acid-modified polyolefin (C2) or boronic acid-modified polyolefin (C3) as the compatibilizer (C), because the molded components have excellent impact resistance and stress cracking resistance, and the gasoline barrier properties and the organic solvent resistance are significantly improved. In Comparative Example 8, wherein the content of the barrier resin (A) is less than 5 wt %, and Comparative Example 6, which contains only thermoplastic resin (D), the gasoline barrier properties were significantly poorer. Furthermore, in Comparative Example 5, which contains only the barrier resin (A), and Comparative Example 7, wherein the content of the barrier resin (A) is more than 70 wt %, the thermal fusion properties were unacceptable.

C. Production Example 3 of a Single Layered Molded Component

In this example, a resin composition comprising polyamide resin and carboxylic acid-modified polyolefin was used as the compatibilizer (C) for production of a single layered molded component.

Example 9

A blend comprising 30 parts by weight of EVOH (a-2), 5 parts by weight of polyamide resin (f-1), 10 parts by weight of ethylene—methacrylic acid random copolymer (EMAA; c-6) and 55 parts by weight of high density polyethylene (HDPE; d-3) was obtained in the following manner. The polyamide resin (f-1) and the EMAA (c-6) were fed into a twin screw type vent extruder, and extruded at 220° C. in the presence of nitrogen and pelletized. The obtained blended pellets and the remaining EVOH (a-2) and HDPE (d-3) were blended in the same manner, so that pellets of a resin composition were obtained.

The obtained pellets were molded into a fuel container (FIG. 2) provided with a connector-like cylindrical single layered injection-molded article (FIG. 1) in the same manner as in Example 1. The gasoline barrier properties were evaluated. The impact resistance was evaluated in the following manner. The blended pellets were injection-molded with an injection-molded machine into sample pieces. These sample pieces (n=5) were stored at 20° C.–65% RH for one week. Then, the strength against impact was measured with an Izod impact tester according to ASTM-D256. Table 4 shows the results.

Examples 10 to 11 and Comparative Example 9 to 10

A fuel container (FIG. 2) provided with a connector-like cylindrical single layered injection-molded article (FIG. 1) was produced in the same manner as in Example 9, except that the barrier resin (A) (a-2) and (a-3), the polyamide resin (f-1), the compatibilizer (C) (c-6) and (c-7) and the thermoplastic resin (D) (d-3) shown in Table 1 were used in a blend ratio shown in Table 4. Evaluation was conducted in the same manner as in Example 9. When the resin composition contains three components, the components were blended in one kneading operation. When the resin composition contains one component, no kneading operation was performed. Table 4 shows the results.

TABLE 4

| | Resin composition | | | Performance Evaluation | | |
|---|---|---|---|---|---|---|
| | A | Compatibilizer (C) | | D | Gasoline | | |
| | parts by weight | parts by weight | parts by weight | parts by weight | barrier properties 1) | Impact strength | Continuous phase |
| Ex. 9 | a-2 30 | f-1 5 | c-6 10 | d-3 55 | 0.032 | 4.5 | d-3 |
| Ex. 10 | a-2 35 | f-1 10 | c-7 15 | d-3 40 | 0.028 | 5 | d-3 |
| Ex. 11 | a-3 25 | f-1 10 | c-7 10 | d-3 55 | 0.035 | 5 | d-3 |
| Com. Ex. 9 | — | — | — | d-3 100 | 0.15 | 6 | d-3 |
| Com. Ex. 10 | a-2 30 | f-1 10 | — | d-3 60 | 0.036 | 3 | d-3 |

1) Unit: g/pkg · week
2) Unit: Kgf · cm/cm$^2$

The fuel container provided with a single layered injection-molded component molded from the resin composition comprising polyamide and carboxylic acid-modified polyolefin as the compatibilizer (C) has good appearance and excellent performance with regard to gasoline barrier properties and the impact resistance.

D. Production 1 of a Multilayered Molded Component

Examples 12 to 18 and Comparative Examples 11 to 12

Examples 12 to 18 are examples showing the production of a multilayered molded component, including the case where a resin composition comprising the compatibilizer (C) and the thermoplastic resin (D) was used as the thermoplastic resin (B).

Example 12

A blend comprising 70 parts by weight of polyethylene (d-2) having a MFR of 0.3 g/10 min (at 190° C.–2160 g load) and a density of 0.952 g/cm$^3$ and 30 parts by weight of maleic anhydride modified polyethylene (c-4) ("Modic H541" manufactured by Mitsubishi Chemicals) was obtained in the following manner. The polyethylene (d-2) having a density of 0.952 g/cm$^3$ and the maleic anhydride-modified polyethylene (c-4) were fed into a twin screw type vent extruder, and extruded at 220° C. in the presence of nitrogen and pelletized so that pellets of a resin composition were obtained.

The obtained pellets and EVOH (a-2) having an ethylene content of 32 mol %, a degree of saponification of 99.5% and a MFR of 1.6 g/10 min (at 190° C.–2160 g load) were fed to a co-injection molding machine as appropriate to produce a cylindrical multilayered injection-molded article (a connector-like molded article) with three layers of two kinds having a shape shown in FIG. 1. The outer diameter of 70 mm and the height of 40 mm were the same as those of the single layered molded article. However, the inner diameter of 62 mm was different from that of the single layered molded article. The layer structure was (outer) thermoplastic resin (B)/EVOH (A) layer/thermoplastic resin (B) layer (inner), and the ratio in thickness of the layers was (outer) 55/15/30% (inner). As shown in FIG. 2, this connector-like molded article was attached to a container body 2, and a pipe 3 was attached to the port of the connector-like molded article 1. On the other hand, an EVOH based multilayered fuel container having the same layer structure was produced with the same resin as that of Example 1.

Two holes with a diameter of 65 mm were opened for mounting the connector on the obtained multilayered fuel container. Thereafter, these portions and the connector-like molded articles with three layers of two kinds were melted for 40 seconds on an iron plate with 250° C., and pressed into each other for thermal fusion. Thus, a multilayered fuel container provided with two connectors was obtained. Using the obtained multilayered fuel container to which the two multilayered injection-molded articles were fused, the gasoline barrier properties and the adhesion strength were evaluated in the following manner. Table 5 shows the results.

(1) Gasoline Barrier Properties 25 liters of a model gasoline (toluene/iso-octane=50/50 vol%) were filled in the obtained multilayered fuel container having two openings. Then, an aluminum plate with a diameter of 80 mm and a thickness of 0.5 mm was adhered firmly to one side of the connector-like molded article with an epoxy adhesive. Thereafter, the weight loss (W) (n=5) in an explosion-proof air-conditioned chamber (40° C.–65% RH) was measured 60 days later. As a control, a fuel container was prepared wherein multilayered sheets (HDPE/adhesive resin/EVOH (a-1)/adhesive resin/HDPE=2100/100/600/100/110 μm) were fused to the two openings in the same manner as the connectors. In this case, the multilayered sheets were produced by using the same resin as that used for the multilayered fuel container, and the side of the HDPE layer having a thickness of 1100 μm was thermally fused to the fuel container body. The weight loss of the model gasoline (w) was measured in the same manner. Gasoline loss from the connector portions was calculated based on Equation 1.

$$\text{Gasoline loss from the connector} = W - w \tag{1}$$

(2) Adhesion Strength

The peripheral portion of the connector of a gasoline tank provided with the connector-like multilayered molded article used for measurement of the gasoline barrier properties was cut out in a diameter of 20cm with the connector at the center. This connector portion of a test piece and the cut-out fuel container sheet portion were fixed, and the strength required by the fused portion to be detached was measured with an autograph (AG-500A manufactured by Shimazu).

(3) Interlaminar Shear Strength of the Multilayered Article

A multilayered flat plate having substantially the same layer structure as that of the obtained connector-like molded component was produced, and the interlaminar shear strength thereof was measured. More specifically, a 100×

100×5 mm (length×width×thickness) multilayered flat plate with three layers of two kinds (having a thickness structure of the thermoplastic resin (B)/EVOH (A)/thermoplastic resin (B)=2.75/0.75/1.5 mm) was molded by injection molding. Using the multilayered flat plate, a test piece was prepared according to JISK7057, and the interlaminar shear strength thereof was measured. The interlaminar shear strength as used herein refers to the strength when breakage (delamination) occurred between the thermoplastic resin (B) and the EVOH (A) layer.

Examples 13 to 17 and Comparative Examples 11 to 12

Using the barrier resin (A) (a-2), the thermoplastic resin (B) (b-4), (b-5) and (b-6), the compatibilizer (C) (c-1), (c-4) and (c-5) and the thermoplastic resin (D) (d-2) shown in Table 1, a connector-like molded article was produced with the structure described in Table 5 in the same manner as in a diameter of 80 mm and a thickness of 0.5 mm was adhered firmly to one side of the connector-like molded article with an epoxy adhesive. Thereafter, a weight loss (W) (n=5) in an explosion-proof air-conditioned chamber (40° C.–65% RH) was measured 60 days later. As a control, a fuel container was prepared wherein multilayered sheets (EVOH (A-1)/adhesive resin/HDPE=600/100/3300 μm) were fused to the two openings in the same manner as the connectors. In this case, the multilayered sheets were produced by using the same resin as that used for the multilayered tank, and the side of HDPE layer was thermally fused to the fuel container body. A weight loss of the model gasoline (w) was measured in the same manner. Gasoline loss from the connector portions was calculated based on Equation 1.

$$\text{Gasoline loss from the connector} = W - w \tag{1}$$

TABLE 5

| | EVOH (A) layer | Thermoplastic resin (B) layer | Weight (%) | Gasoline barrier properties 1) | Adhesion strength (kgf) | Interlaminar shear strength (kgf/mm$^2$) |
|---|---|---|---|---|---|---|
| Ex. 12 | (a-2) | (d-2)/(c-4) | 70/30 | <0.01 | 30 | 1.3 |
| Ex. 13 | (a-2) | (d-2)/(c-5) | 70/30 | <0.01 | 30 | 1.1 |
| Ex. 14 | (a-2) | (d-2)/(c-1) | 70/30 | <0.01 | 20 | 0.35 |
| Ex. 15 | (a-2) | (b-5) | 100 | <0.01 | 25 | 3.1 |
| Ex. 16 | (a-2) | (b-6) | 100 | <0.01 | 20 | 3 |
| Ex. 17 | (a-2) | (b-4) | 100 | <0.01 | 50 | 0.04 |
| Ex. 18 | (a-2) | (d-2)/(c-4) | 70/30 | <0.01 | 35 | 1.2 |
| Com. Ex. 11 | — | (d-2) single layer | — | 8.5 | 50 | — |
| Com. Ex. 12 | (a-2) single layer | — | — | — | 0 | — |

*1) Unit: g/2 pieces · 60 days

Example 12. Then, evaluation was conducted in the same manner as in Example 12. Table 5 shows the results.

Example 18

The thermoplastic resin (B) ((d-2)/(c-4)=70/30) and EVOH (a-2) having an ethylene content of 32 mol %, a degree of saponification of 99.5%, a MFR of 1.6 g/10 min (at 190° C.–2160 g load) were fed into a two-color molding machine as appropriate, and a cylindrical multilayered injection-molded article (FIG. 1) with two layers of two kinds having an inner diameter of 62 mm, an outer diameter of 70 mm and a height of 40 mm was produced. The layer structure was (outer) EVOH (A) layer/thermoplastic resin (B) layer (inner), and the ratio in thickness was (A) layer/(B) layer=15/85%. This multilayered molded article was attached to a fuel container produced in the same manner as in Example 1, in the same manner in Example 12, and the adhesion strength and the interlaminar shear strength of the multilayered article were evaluated in the same manner as in Example 12. For measurement of the shear strength, an injection-molded multilayered flat plate having substantially the same structure of that of the obtained multilayered injection-molded component, i.e., a thickness and layer structure of the resin composition (A)/thermoplastic resin (B)=0.75/4.25 mm was used. Table 5 shows the results. The gasoline barrier properties were evaluated in the following manner.

Gasoline Barrier Properties 25 liters of a model gasoline (toluene/iso-octane=50/50 vol %) were filled in the obtained multilayered fuel container having two openings. Then, an aluminum plate with

E. Production 2 of a Multilayered Molded Component

Examples 19 to 26 and Comparative Examples 13 to 17

Examples 19 to 26 are examples illustrating the production of a multilayered molded component with a resin composition layer comprising EVOH, the compatibilizer (C) and the thermoplastic resin (D) as the barrier resin (A) layer.

Example 19

A resin composition comprising 40 parts by weight of EVOH (a-2) having an ethylene content of 32 mol %, a degree of saponification of 99.5%, and a MFR of 1.6 g/10 min (at 190° C.–2160 g load), 20 parts by weight of a saponified ethylene-vinyl acetate copolymer (c-1) having an ethylene content of 89 mol %, a degree of saponification of 97%, and a MFR of 5 g/10 min (at 190° C.–2160 g load), and polyethylene (d-2) having a MFR of 0.3 g/10 min (at 190° C.–2160 g load) and a density of 0.952 g/cm$^3$ was obtained in the following manner. The EVOH (a-2), the saponified ethylene-vinyl acetate copolymer (c-1) having an ethylene content of 89 mol % and a degree of saponification of 97% and the polyethylene (d-2) having a density of 0.952 g/cm$^3$ were fed into a twin screw type vent extruder, and extruded at 220° C. in the presence of nitrogen and pelletized so that pellets of the resin composition were obtained.

The obtained pellets of the resin composition and polyethylene (b-4) having a density of 0.952 g/cm$^3$ were fed to a co-injection molding machine as appropriate to produce a cylindrical multilayered injection-molded article with three layers of two kinds having the same shape as in Example 12, an inner diameter of 62 mm, an outer diameter of 70 mm and a height of 40 mm. The layer structure was thermoplastic resin (B) layer/resin composition (A) layer/thermoplastic resin (B) layer, and the ratio in thickness of the layers was (outer) 15/70/15% (inner). This multilayered molded component (connector) was attached to a multilayered fuel container obtained in the same manner as Example 1 to produce a multilayered fuel container provided with a connector. Then, the adhesion strength and the interlaminar shear strength of the multilayered article were evaluated in the same manner as in Example 12. For the measurement of the shear strength, an injection-molded multilayered flat plate having substantially the same structure of that of the obtained multilayered injection-molded component, i.e., a thickness and layer structure of thermoplastic resin (B)/resin composition (A)/thermoplastic resin (B)=0.75/3.5/0.75 mm was used. The gasoline barrier properties were evaluated in the following manner.

Gasoline Barrier Properties 25 liters of a model gasoline (toluene/iso-octane=50/50 vol %) were filled in the obtained multilayered fuel container having two openings. Then, an aluminum plate with a diameter of 80 mm and a thickness of 0.5 mm was adhered firmly to one side of the connector-like molded article with an epoxy adhesive. Thereafter, the weight loss (W) (n=5) in an explosion-proof air-conditioned chamber (40° C.–65% RH) was measured 60 days later. As a control, a fuel container was prepared wherein multilayered sheets (HDPE/adhesive resin/EVOH (a-2)/adhesive resin/HDPE=400/200/2800/200/400 µm) were fused to the two openings in the same manner as the connectors. In this case, the multilayered sheets were produced by using the same resin as that used for the multilayered fuel container. The weight loss of the model gasoline (w) was measured in the same manner. The gasoline loss from the connector portions was calculated based on Equation 1.

$$\text{Gasoline loss from the connector} = W - w \tag{1}$$

Examples 20 to 24 and Comparative Examples 13 to 17

Using the barrier resin (A) (a-2), the thermoplastic resin (B) (b-4), the compatibilizer (C) (c-1), (c-4) and (c-5) and the thermoplastic resin (D) (d-2) described in Table 1, a connector-like molded article having a structure described in Table 6 was produced in the same manner as in Example 16. Then, an evaluation was conducted in the same manner as in Example 19. Table 6 shows the results.

Example 25

The resin composition (A) ((a-2)/(c-1)/(d-2)=40/20/40) and polyethylene (b-4) having a density of 0.952 g/cm³ described in Table 6 were fed to a two-color molding machine as appropriate to produce a cylindrical multilayered injection-molded article (FIG. 1) with two layers of two kinds having the same shape as in Example 12 with an inner diameter of 62 mm, an outer diameter of 70 mm and a height of 40 mm. The layer structure was (outer) resin composition (A) layer/thermoplastic resin (B) layer (inner), and the ratio in thickness of the layers was the (A) layer/the (B) layer= 70/30%. This multilayered molded component was attached to a fuel container and a pipe in the same manner as Example 19. The same fuel container as in Example 19 was used for evaluation, and the adhesion strength and the interlaminar shear strength of the multilayered article were evaluated in the same manner as in Example 12. For the measurement of the shear strength, an injection-molded multilayered flat plate having substantially the same structure of that of the obtained multilayered injection-molded component, i.e., a thickness and layer structure of the resin composition (A)/thermoplastic resin (B)=2.8/1.2 mm was used. Table 6 shows the results. The gasoline barrier properties were evaluated in the following manner.

Gasoline Barrier Properties 25 liters of a model gasoline (toluene/iso-octane=50/50 vol %) were filled in the obtained multilayered fuel container having two openings. Then, an aluminum plate with a diameter of 80 mm and a thickness of 0.5 mm was adhered firmly to one side of the connector-like molded article with an epoxy adhesive. Thereafter, the weight loss (W) (n=5) in an explosion-proof air-conditioned chamber (40° C.–65% RH) was measured 60 days later. As a control, a fuel container was prepared wherein multilayered sheets (EVOH (a-2)/adhesive resin/HDPE=2800/100/1100 µm) were thermally fused to the two openings in the same manner as the connectors. In this case, the multilayered sheets were produced by using the same resin as that used for the multilayered fuel container, and the side of HDPE layer was thermally fused to the fuel container body. A weight loss of the model gasoline (w) was measured in the same manner. Gasoline loss from the connector portions was calculated based on Equation 1.

$$\text{Gasoline loss from the connector} = W - w \tag{1}$$

Example 26

The resin composition (A) ((a-2)/(f-1)/(c-7)/(d-2)=40/4/6/50) described in Table 6 was obtained by first blending resin (f-1) and resin (c-7) and pelletizing the blend and then blending resin (a-2) and (d-2). This resin composition (A) and the thermoplastic resin (B) (polyethylene (b-4) having a density of 0.952 g/cm³) were fed to a co-injection molding machine as appropriate to produce a cylindrical multilayered injection-molded article with three layers of two kinds of resin having the same shape as in Example 12 with an inner diameter of 62 mm, an outer diameter of 70 mm and a height of 40 mm. The layer structure was thermoplastic resin (B) layer/resin composition (A) layer/thermoplastic resin (B) layer, and the ratio in thickness of the layers was (outer) 15/70/15% (inner). This multilayered molded component (connector) was attached to a multilayered fuel container obtained in the same manner as Example 1 to produce a multilayered container provided with a connector. Then, the adhesion strength, the interlaminar shear strength of the multilayered article and the gasoline barrier properties were evaluated in the same manner as in Example 19. For measurement of the shear strength, an injection- molded multilayered flat plate having substantially the same structure of that of the obtained multilayered injection-molded component, i.e., a thickness and layer structure of the thermoplastic resin (B)/resin composition (A)/thermoplastic resin (B)=0.75/3.5/0.75 mm was used. Table 6 shows the results.

TABLE 6

|  | Barrier resin (A) layer (resin composition) | Weight (%) | Thermoplastic resin (B) layer | Gasoline barrier properties *1) | Adhesion strength (kgf) | Interlaminar shear strength (kgf/mm$^2$) |
|---|---|---|---|---|---|---|
| Ex. 19 | (a-2)/(c-1)/(d-2) | 40/20/40 | (b-4) | 0.02 | 50 | 2.1 |
| Ex. 20 | (a-2)/(c-4)/(d-2) | 40/20/40 | (b-4) | 0.09 | 50 | 3.1 |
| Ex. 21 | (a-2)/(c-5)/(d-2) | 40/20/40 | (b-4) | 0.1 | 50 | 2.9 |
| Ex. 22 | (a-2)/(c-1) | 50/50 | (b-4) | 0.01 | 50 | 1.9 |
| Ex. 23 | (a-2)/(c-4) | 50/50 | (b-4) | 0.06 | 50 | 3.0 |
| Ex. 24 | (a-2)/(c-5) | 50/50 | (b-4) | 0.08 | 50 | 2.9 |
| Ex. 25 | (a-2)/(c-1)/(d-2) | 40/20/40 | (b-4) | 0.02 | 50 | 2 |
| Ex. 26 | (a-2)/(f-1)/(c-7)/(d-2) | 40/4/6/50 | (b-4) | 0.05 | 50 | 3.0 |
| Com. Ex. 13 | (a-2) | 100 | (b-4) | <0.01 | 50 | 0.04 |
| Com. Ex. 14 | (a-2)/(c-1)/(d-2) | 90/5/5 | (b-4) | <0.01 | 50 | 0.04 |
| Com. Ex. 15 | (a-2)/(c-1)/(d-2) | 5/10/85 | (b-4) | 7.1 | 50 | 3.4 |
| Com. Ex. 16 | — | — | (b-4) single layer | 7.4 | 50 | — |
| Com. Ex. 17 | (a-2) single layer | — | — | — | 0 | — |

*1) Unit: g/2 pieces · 60 days

The multilayered molded components that are mounted on the fuel container of the present invention obtained in Examples 19 to 26 have excellent gasoline barrier properties and thermal fusion properties, and sufficient mechanical strength. In particular, in Examples 19, 22 and 25, where the saponified ethylene—vinyl acetate copolymer (c-1) having an ethylene content of 89 mol % and a degree of saponification of 97 mol % are employed, the gasoline barrier properties are significantly improved.

On the other hand, in Comparative Examples 13 and 14, wherein the content of the EVOH contained in the resin composition (A) is more than 80 wt %, the interlaminar shear strength between the resin composition (A) layer and the thermoplastic resin (B) layer is unsatisfactory, and the mechanical strength is poor. In Comparative Example 15, wherein the content of the EVOH contained in the resin composition (A) is less than 10 wt %, the gasoline barrier properties are unsatisfactory. Furthermore, in Comparative Example 16, wherein the molded component is formed only of a polyethylene single layer, the gasoline barrier properties are insufficient. In Comparative Example 17, wherein the molded component is formed only of the EVOH, the thermal fusion properties to the fuel container body are insufficient.

Industrial Applicability

A molded component is formed by mixing or laminating a barrier resin (A) having a solubility parameter (calculated from the Fedors' equation) of more than 11 and a thermoplastic resin (B) having a solubility parameter (calculated from the Fedors' equation) of not more than 11. The molded component has excellent gasoline barrier properties and also excellent performance in gas barrier properties, impact resistance, thermal fusion properties, mechanical strength, stress cracking resistance, and organic solvent resistance. The fuel container provided with such a molded component is significantly improved with regard to leakage of fuel from the molded component portion.

What is claimed is:

1. A fuel container comprising a fuel container body and a molded component mounted on the fuel container, the molded component comprising a barrier resin (A) having a solubility parameter (calculated from the Fedors' equation) of more than 11 and a thermoplastic resin (B) having a solubility parameter (calculated from the Fedors' equation) of not more than 11, the barrier resin (A) and the thermoplastic resin (B) being mixed or laminated.

2. The fuel container according to claim 1, wherein the molded component is a component molded from a blended resin composition of 5 to 70% by weight of the barrier resin (A) and 30 to 95% by weight of the thermoplastic resin (B).

3. The fuel container according to claim 2, wherein a gasoline permeation amount of the barrier resin (A) is not more than 10g·20 μm/m$^2$·day (as measured at 40° C. 65% RH).

4. The fuel container according to claim 2, wherein the barrier resin (A) is at least one selected from the group consisting of polyvinyl alcohol resin, polyamide and aliphatic polyketone.

5. The fuel container according to claim 4, wherein the barrier resin (A) is an ethylene-vinyl alcohol copolymer having an ethylene content of 5 to 60% by mol and a degree of saponification of at least 85%.

6. The fuel container according to claim 2, wherein the thermoplastic resin (B) is a polyolefin resin.

7. The fuel container according to claim 6, wherein the thermoplastic resin (B) is selected from the group consisting of a saponified ethylene-vinyl acetate copolymer having an ethylene content of 70 to 99% by mol and a degree of saponification of at least 40%, carboxylic acid-modified polyolefin and boronic acid-modified polyolefin.

8. The fuel container according to claim 2, wherein the thermoplastic resin (B) comprises a compatibilizer (C) and a thermoplastic resin (D) having a solubility parameter (calculated from the Fedors' equation) of not more than 11 other than the compatibilizer (C), and a blending ratio of components, (A), (C) and (D) is 5 to 70% by weight for (A), 1 to 85% by weight for (C), and 10 to 94% by weight for (D).

9. The fuel container according to claim 8, wherein the compatibilizer (C) is selected from the group consisting of a saponified ethylene-vinyl acetate copolymer having an ethylene content of 70 to 99% by mol and a degree of saponification of at least 40%, carboxylic acid-modified polyolefin and boronic acid-modified polyolefin.

10. The fuel container according to claim 8, wherein the compatibilizer (C) is a resin composition comprising 2 to 98% by weight of polyamide and 2 to 98% by weight of carboxylic acid-modified polyolefin.

11. The fuel container according to claim 8, wherein the thermoplastic resin (D) is polyethylene having a density of at least 0.93 g/cm$^3$.

12. The fuel container according to claim 2, wherein a whole or a part of the molded component is formed by injection molding.

13. The fuel container according to claim 1, wherein the molded component is a multilayered molded component comprising the barrier resin (A) and the thermoplastic resin (B), the barrier resin being at least one selected from the group consisting of polyvinyl alcohol resin, polyamide and aliphatic polyketone.

14. The fuel container according to claim 13, wherein the barrier resin (A) is an ethylene-vinyl alcohol copolymer (A1) having an ethylene content of 5 to 60% by mol and a degree of saponification of at least 85%.

15. The fuel container according to claim 14, wherein the barrier resin (A) is a resin composition comprising 10 to 80% by weight of ethylene-vinyl alcohol copolymer, 1 to 90% by weight of a compatibilizer (C) and 0 to 89% by w eight of a thermoplastic resin (D) having a solubility parameter (calculated from the Fedors' equation) of not more than 11 other than (A) or (C).

16. The fuel container according to claim 15, wherein the compatibilizer (C) is selected from the group consisting of a saponified ethylene-vinyl acetate copolymer having an ethylene content of 70 to 99% by mol and a degree of saponification of at least 40%, carboxylic acid-modified polyolefin and boronic acid-modified polyolefin.

17. The fuel container according to claim 15, wherein the compatibilizer (C) is a resin composition comprising 2 to 98% by weight of polyamide and 2 to 98% by weight of carboxylic acid-modified polyolefin.

18. The fuel container according to claim 13, wherein the thermoplastic resin (B) is a polyolefin resin.

19. The fuel container according to claim 18, wherein the thermoplastic resin (B) comprises polyethylene having a density of at least 0.93 g/cm$^3$.

20. The fuel container according to claim 18, wherein the thermoplastic resin (B) is selected from the group consisting of a saponified ethylene-vinyl acetate copolymer having an ethylene content of 70 to 99% by mol and a degree of saponification of at least 40%, carboxylic acid-modified polyolefin and boronic acid-modified polyolefin.

21. The fuel container according to claim 18, wherein the thermoplastic resin (B) is a resin composition comprising 1 to 99% by weight of a compatibilizer (C) selected from the group consisting of a saponified ethylene-vinyl acetate copolymer having an ethylene content of 70 to 99% by mol and a degree of saponification of at least 40%, carboxylic acid-modified polyolefin and boronic acid-modified polyolefin, and 1 to 99% by weight of a thermoplastic resin (D) having a solubility parameter (calculated from the Fedors' equation) of not more than 11 other than (C).

22. The fuel container according to claim 13, wherein at least one layer of the barrier resin (A) layer or the thermoplastic resin (B) layer contains 1 to 50% by weight of inorganic filler.

23. The fuel container according to claim 13, wherein the molded component is molded with a multilayer injection molding machine, a two-color molding machine, or a co-injection molding machine.

24. The fuel container according to claim 13, wherein the molded component is mounted on a fuel container body via the thermoplastic resin (B) layer.

25. The fuel container according to claim 1, wherein the molded component is a connector for a fuel container, a cap for a fuel container or a valve for a fuel container.

26. The fuel container according to claim 1, wherein the molded component is mounted on a fuel container body by thermal fusion.

27. A fuel container, wherein a component formed of a thermosetting resin (E) is mounted on the fuel container provided with a molded component according to claim 1, via the molded component.

28. The fuel container according to claim 27, wherein the thermosetting resin (E) is polymethylene oxide.

\* \* \* \* \*

UNITED STATES PATENT AND TRADEMARK OFFICE
CERTIFICATE OF CORRECTION

PATENT NO.      : 6,398,059 B1
DATED           : June 4, 2002
INVENTOR(S)     : Hayashi et al.

It is certified that error appears in the above-identified patent and that said Letters Patent is hereby corrected as shown below:

<u>Title page,</u>
Item [30], Foreign Application Data, should read as follows:
-- [30]          Foreign Application Priority Data

| | | |
|---|---|---|
| Mar. 4, 1999 | (JP) | 11-56546 |
| Jun. 18, 1999 | (JP) | 11-172151 |
| Jun. 18, 1999 | (JP) | 11-172152 |
| Sep. 7, 1999 | (JP) | 11-253006 |
| Sep. 7, 1999 | (JP) | 11-253007 |
| Nov. 8, 1999 | (JP) | 11-316838 |
| Nov. 8, 1999 | (JP) | 11-316839 -- |

Signed and Sealed this

Fifteenth Day of October, 2002

*Attest:*

*Attesting Officer*

JAMES E. ROGAN
*Director of the United States Patent and Trademark Office*